US010114544B2

(12) United States Patent
Gross

(10) Patent No.: US 10,114,544 B2
(45) Date of Patent: Oct. 30, 2018

(54) SYSTEMS AND METHODS FOR GENERATING AND PROVIDING INTELLIGENT TIME TO LEAVE REMINDERS

(71) Applicant: Apple Inc., Cupertino, CA (US)

(72) Inventor: Daniel C. Gross, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 150 days.

(21) Appl. No.: 14/986,299

(22) Filed: Dec. 31, 2015

(65) Prior Publication Data
US 2016/0357393 A1 Dec. 8, 2016

Related U.S. Application Data

(60) Provisional application No. 62/172,078, filed on Jun. 6, 2015.

(51) Int. Cl.
*G06F 3/048* (2013.01)
*G06F 3/0488* (2013.01)
(Continued)

(52) U.S. Cl.
CPC ............ *G06F 3/0488* (2013.01); *G06Q 10/00* (2013.01); *G06Q 10/10* (2013.01); *G06Q 10/109* (2013.01)

(58) Field of Classification Search
CPC ...... G06F 3/0488; G06Q 10/00; G06Q 10/10; G06Q 10/1093; H04M 1/72572;
(Continued)

(56) References Cited

U.S. PATENT DOCUMENTS

2010/0191454 A1* 7/2010 Shirai .................. G01C 21/362
701/533
2014/0163882 A1 6/2014 Stahl et al.

FOREIGN PATENT DOCUMENTS

WO WO 2011160044 A2 12/2011
WO WO 2014200763 A1 12/2014

OTHER PUBLICATIONS

International Search Report and Written Opinion, dated Aug. 3, 2016, received in International Patent Application No. PCT/US2016/033778, which corresponds with U.S. Appl. No. 14/986,299, 12 pages.

* cited by examiner

*Primary Examiner* — Jeffrey A Gaffin
*Assistant Examiner* — Ayesha Huertas Torres
(74) *Attorney, Agent, or Firm* — Morgan, Lewis & Bockius LLP

(57) ABSTRACT

Systems and methods for generating and providing intelligent time to leave reminders on an electronic device are disclosed herein. In one aspect, the method includes: automatically, without human intervention, identifying a calendar entry including a first identifier (e.g., text in the title of a calendar entry that relates to a location, such as "go to dental checkup"), the first identifier corresponding to a geographic location that is unknown. The method further includes: automatically, without human intervention, retrieving a previously-visited address (e.g., a street address or GPS coordinates for the street address) associated with the first identifier. The method also includes: automatically, without human intervention, determining a departure time for the calendar entry based on the previously-visited address (e.g., based on a route from the current location of the device to the previously-visited address). The method (Continued)

additionally includes: automatically, without human intervention, associating the determined departure time with the calendar entry.

36 Claims, 16 Drawing Sheets

(51) Int. Cl.
*G06Q 10/00* (2012.01)
*G06Q 10/10* (2012.01)

(58) Field of Classification Search
CPC .......................... G01C 21/343; G01C 21/362; G01C 21/3617; G01C 21/3484
See application file for complete search history.

| Calendar Entry Data Structure 302-1 | Calendar Entry ID | Title | Location | Date and Time | Alert | Departure Time Reminder |
|---|---|---|---|---|---|---|
| Header 312-0 | | | | | | ... |
| Record 312-1 | 1 | Go to Dentist | NULL | 6/12/15, 12 PM – 2 PM | 30 min. before | NULL |
| Record 312-2 | 2 | 1:1 with Manager | Address ID 2 | 6/13/15, 9:30 AM – 10 AM | 5 min. before | NULL |
| Record 312-3 | 3 | Checkup with Dentist | Address ID 1 | 5/12/14, 12 PM – 2 PM | 1 hr. before | 5/12/14, 11:25 AM |
| Record 312-N | ... | ... | ... | ... | ... | ... |

| Previously-Visited Address Data Structure 402-1 | Address ID | Name | Arrival Address | Departure Address | Associated Items | Arrival Time |
|---|---|---|---|---|---|---|
| Header 412-0 | | | | | | |
| Record 412-1 | 1 | Dentist | 123 N. Dentist St, City, State, 12345 | 88 W. 2nd, City, State 12345 | Calendar Entry 3, Message 23 | 5/12/14, 11:15 AM |
| Record 412-2 | 2 | Work | 123 N. Work St, City, State, 12345 | 43 E. 3rd, City, State 12345 | Calendar Entry 2, Email 56, Email 22, Message 17 | 6/13/15, 9:15 AM |
| Record 412-N | ... | | ... | ... | ... | ... |

SYSTEMS AND METHODS FOR GENERATING AND PROVIDING INTELLIGENT TIME TO LEAVE REMINDERS

RELATED APPLICATION

This application claims priority to U.S. Provisional Application Ser. No. 62/172,078, filed Jun. 6, 2015, which is incorporated by reference herein in its entirety.

TECHNICAL FIELD

The embodiments herein generally relate to electronic devices with touch-sensitive displays and, more specifically, to systems and methods for generating and providing intelligent time to leave reminders.

BACKGROUND

Users of handheld electronic devices with touch-sensitive displays often create and receive numerous calendar entries to help remind them about upcoming events. These calendar entries often contain a reminder or alert that is displayed to the user when a respective event is scheduled to occur some amount of time in the future (e.g., 15 minutes, 30 minutes, 1 hour, and the like). Users typically select the amount of time based on the lead time they need before the event or they simply choose a default value without considering how long it will take to reach an event on time. Thus, the reminder or alert is provided based simply on a default value or based on inexact and/or outdated information from the user. Additionally, for calendar entries that do not include location information, the reminder or alert does not take into account information regarding previously-visited addresses that may be accessible (and usable to create accurate reminders) on the handheld electronic device.

SUMMARY

Accordingly, there is a need for electronic devices with faster, more efficient methods and interfaces for generating and providing intelligent reminders that allow sufficient time for a user to leave and reach a destination by the start time for an event. Such methods and interfaces optionally complement or replace conventional methods for providing generic or default time to leave reminders. Such methods and interfaces reduce the cognitive burden on a user and produce a more efficient human-machine interface. Moreover, such methods and interfaces help to extend the life of the touch-sensitive display by requiring a fewer number of touch inputs (e.g., by eliminating the need for users to repeatedly interact with the device in order to search for and review address/ navigation details).

The above deficiencies and other problems associated with user interfaces for electronic devices with touch-sensitive surfaces are reduced or eliminated by the devices disclosed herein. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touchscreen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photography, digital video, web browsing, and digital music. Executable instructions for performing these functions are, optionally, included in a non-transitory computer-readable storage medium or other computer program product configured for execution by one or more processors.

(A1) In accordance with some embodiments, a method is performed at an electronic device (e.g., portable multifunction device 100, FIG. 1A) with a touch-sensitive display (touch screen 112, FIG. 1C). The method includes: automatically, without human intervention, identifying a calendar entry including a first identifier, the first identifier corresponding to a geographic location that is unknown. The method further includes: automatically, without human intervention, retrieving a previously-visited address associated with the first identifier. The method also includes: automatically, without human intervention, determining a departure time for the calendar entry based on the previously-visited address. The method additionally includes: automatically, without human intervention, associating the determined departure time with the calendar entry. In other words, the previously-visited address is located using the first identifier and the unknown geographic location is then resolved (or determined) to be the previously-visited address based on presence of the first identifier in (i) an item that is associated with the previously-visited address (e.g., a different calendar entry, a text message, an email message, and the like) and (ii) the calendar entry.

(A2) In some embodiments of the method of A1, the method further includes: providing, on the electronic device, a reminder to the user of the determined departure time for the calendar entry.

(A3) In some embodiments of the method of A2, the calendar entry is associated with a default reminder that is distinct from the reminder provided to the user of the determined departure time for the calendar entry.

(A4) In some embodiments of the method of any one of A2-A3, providing the reminder includes, in accordance with a determination that the departure time is within a predetermined amount of time of a current time, providing the reminder.

(A5) In some embodiments of the method of any one of A1-A4, determining the departure time includes: (i) determining a current address corresponding to the electronic device, (ii) determining a route from the current address to the previously-visited address, and (iii) determining the departure time based on an amount of time to complete the route so that the user will reach the previously-visited address within a predefined amount of time of a start time associated with the calendar entry.

(A6) In some embodiments of the method of A5, the route is selected from a plurality of available routes from the current address to the previously-visited address in accordance with routing preferences associated with the user of the electronic device.

(A7) In some embodiments of the method of any one of A2-A6, associating the determined departure time with the calendar entry includes generating the reminder and updating the calendar entry to include the generated reminder.

(A8) In some embodiments of the method of any one of A1-A7, the method further includes: before determining the departure time, receiving a confirmation, on the touch-sensitive display, from the user of the electronic device that the previously-visited address corresponds to the calendar entry. After receiving the confirmation, the method includes: determining the departure time.

(A9) In some embodiments of the method of any one of A1-A8, retrieving the previously-visited address includes retrieving the previously-visited address from a database of previously-visited addresses associated with the user of the electronic device.

(A10) In some embodiments of the method of A9, each previously-visited address in the database of previously-visited addresses corresponds to an address that was previously visited by the user of the electronic device.

(A11) In some embodiments of the method of any one of A9-A10, retrieving the previously-visited address includes performing a lookup in the database of previously-visited addresses using the first identifier.

(A12) In some embodiments of the method of any one of A1-A11, the method further includes: scanning a plurality of new calendar entries during a calendar entry creation process. In accordance with a determination that the first identifier is included in a respective new calendar entry of the plurality of scanned new calendar entries, the method includes: presenting the previously-visited address to the user of the electronic device for inclusion in the respective new calendar entry.

(A13) In some embodiments of the method of any one of A1-A12, the method further includes: determining whether the user has arrived at the previously-visited address (e.g., after determining that the user is travelling to the previously-visited address in accordance with receiving the provided reminder described in A2, above). In accordance with a determination that the user has arrived at the previously-visited address, the method includes: updating location information associated with the previously-visited address. In some embodiments, determining whether the user has arrived at the previously-visited address is performed after (or in response to) providing the reminder.

(A14) In another aspect, an electronic device is provided. In some embodiments, the electronic device includes: a touch-sensitive display, one or more processors, and memory storing one or more programs, which when executed by the one or more processors cause the electronic device to perform the method described in any one of A1-A13.

(A15) In yet another aspect, an electronic device is provided and the electronic device includes: a touch-sensitive display and means for performing the method described in any one of A1-A13.

(A16) In still another aspect, a non-transitory computer-readable storage medium is provided. The non-transitory computer-readable storage medium stores executable instructions that, when executed by an electronic device with a touch-sensitive display, cause the electronic device to perform the method described in any one of A1-A13.

(A17) In still one more aspect, a graphical user interface on an electronic device with a touch-sensitive display is provided. In some embodiments, the graphical user interface includes user interfaces displayed in accordance with the method described in any one of A1-A13.

(A18) In one additional aspect, an electronic device is provided that includes a display unit (e.g., display unit 801, FIG. 8), a touch-sensitive surface unit (e.g., touch-sensitive surface unit 803, FIG. 8), and a processing unit (e.g., processing unit 805, FIG. 8) coupled with the display unit 801 and the touch-sensitive surface unit 803. In some embodiments, the display unit and the touch-sensitive surface unit are integrated in a single touch-sensitive display unit (also referred to herein as a touch-sensitive display). In some embodiments, the processing unit includes an identifying unit (e.g., identifying unit 807), a retrieving unit (e.g., retrieving unit 809), a determining unit (e.g., determining unit 811), an associating unit (e.g., associating unit 813), a providing unit (e.g., providing unit 815), a selecting unit (e.g., selecting unit 817), a generating unit (e.g., generating unit 819), a receiving unit (e.g., receiving unit 821), a performing unit (e.g., performing unit 823), a scanning unit (e.g., scanning unit 825), a presenting unit (e.g., presenting unit 827), and an updating unit (e.g., updating unit 829). The processing unit is configured to: automatically, without human intervention, identify (e.g., with the identifying unit 807) a calendar entry including a first identifier, the first identifier corresponding to a geographic location that is unknown; automatically, without human intervention, retrieve (e.g., with the retrieving unit 809) a previously-visited address associated with the first identifier; automatically, without human intervention, determine (e.g., with the determining unit 811) a departure time for the calendar entry based on the previously-visited address; and automatically, without human intervention, associate (e.g., with the associating unit 813) the determined departure time with the calendar entry.

(A19) In some embodiments of the electronic device of A18, the processing unit is further configured to: provide (e.g., with the providing unit 815 and (or in conjunction with) the display unit 801), on the electronic device, a reminder to the user of the determined departure time for the calendar entry.

(A20) In some embodiments of the electronic device of A19, the calendar entry is associated with a default reminder that is distinct from the reminder provided to the user of the determined departure time for the calendar entry.

(A21) In some embodiments of the electronic device of any one of A19-A20, providing the reminder includes, in accordance with a determination (e.g., by the determining unit 811) that the departure time is within a predetermined amount of time of a current time, providing (e.g., with the providing unit 815 and (or in conjunction with) the display unit 801) the reminder.

(A22) In some embodiments of the electronic device of any one of A18-A21, determining the departure time includes: (i) determining (e.g., with the determining unit 811) a current address corresponding to the electronic device, (ii) determining (e.g., with the determining unit 811) a route from the current address to the previously-visited address, and (iii) determining (e.g., with the determining unit 811) the departure time based on an amount of time to complete the route so that the user will reach the previously-visited address within a predefined amount of time of a start time associated with the calendar entry.

(A23) In some embodiments of the electronic device of A22, the route is selected (e.g., with the selecting unit 817) from a plurality of available routes from the current address to the previously-visited address in accordance with routing preferences associated with the user of the electronic device.

(A24) In some embodiments of the electronic device of any one of A19-A23, associating the determined departure time with the calendar entry includes generating (e.g., with the generating unit 819) the reminder and updating the calendar entry to include the generated reminder.

(A25) In some embodiments of the electronic device of any one of A18-A24, the processing unit is further configured to: before determining the departure time, receive (e.g., with the receiving unit 821) a confirmation, on the touch-sensitive display unit, from the user of the electronic device that the previously-visited address corresponds to the calendar entry. After receiving the confirmation, the processing unit is configured to: determine (e.g., with the determining unit 811) the departure time.

(A26) In some embodiments of the electronic device of any one of A18-A25, retrieving the previously-visited address includes retrieving (e.g., with the retrieving unit 809) the previously-visited address from a database of previously-visited addresses associated with the user of the electronic device.

(A27) In some embodiments of the electronic device of A26, each previously-visited address in the database of previously-visited addresses corresponds to an address that was previously visited by the user of the electronic device.

(A28) In some embodiments of the electronic device of any one of A26-A27, retrieving the previously-visited address includes performing (e.g., with the performing unit 823) a lookup in the database of previously-visited addresses using the first identifier.

(A29) In some embodiments of the electronic device of any one of A18-A28, the processing unit is further configured to: scan (e.g., with the scanning unit 825) a plurality of new calendar entries during a calendar entry creation process. In accordance with a determination (e.g., by the determining unit 811) that the first identifier is included in a respective new calendar entry of the plurality of scanned new calendar entries, the processing unit is configured to: present (e.g., with the presenting unit 827 and (or in conjunction with) the display unit 801) the previously-visited address to the user of the electronic device for inclusion in the respective new calendar entry.

(A30) In some embodiments of the electronic device of any one of A18-A29, the processing unit is further configured to: determine (e.g., with the determining unit 811) whether the user has arrived at the previously-visited address. In accordance with a determination (e.g., by the determining unit 811) that the user has arrived at the previously-visited address, the processing unit is configured to: update (e.g., with the updating unit 829) location information associated with the previously-visited address. In some embodiments, determining whether the user has arrived at the previously-visited address is performed after (or in response to) providing the reminder.

Thus, electronic devices with displays, touch-sensitive surfaces and optionally one or more sensors to detect intensity of contacts with the touch-sensitive surface are provided with faster, more efficient methods and interfaces for generating and providing intelligent time to leave reminders, thereby increasing the effectiveness, efficiency, and user satisfaction with such devices. Such methods and interfaces may complement or replace conventional methods for providing generic or default reminders.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments section below, in conjunction with the following drawings in which like reference numerals refer to corresponding parts throughout the drawings.

DESCRIPTION OF EMBODIMENTS

As discussed above and in more detail below, there is a need for electronic devices with faster, more efficient methods and interfaces for generating and providing intelligent time to leave reminders. In particular, there is a need for generating and providing time to leave reminders based on previously-visited addresses (e.g., if a calendar entry contains a title with the text "visit the Dentist," the time to leave reminder can be generated based on a previously-visited address that corresponds to the Dentist). Disclosed herein are novel methods and interfaces to address these needs. Such methods and interfaces optionally complement or replace conventional methods for generating time to leave reminders. Such methods and interfaces streamline processes for generating time to leave reminders by allowing users to quickly create a calendar entry with a minimal amount of textual input and then automatically, and without human intervention, determine a geographic destination corresponding to the calendar entry based only on the minimal amount of textual input. Thus, users are able to continue quickly creating calendar entries on an electronic device and, by utilizing the methods and interfaces disclosed herein, the electronic device seamlessly creates intelligent time to leave reminders for the calendar entries. In this way, such methods and interfaces help to ensure that users reach events in a timely fashion. Thus, the methods and interfaces disclosed herein reduce the cognitive burden and the time that a user must spend to create calendar entries, thereby creating a more efficient human-machine interface. For battery-operated electronic devices, generating and providing intelligent time to leave reminders faster and more efficiently both conserves power and increases the time between battery charges (e.g., by automatically performing tasks that conventionally require extensive user interactions, such as automatically identifying a previously-visited addresses as the destination for a calendar entry that was created without specific location details).

Figure 1A:
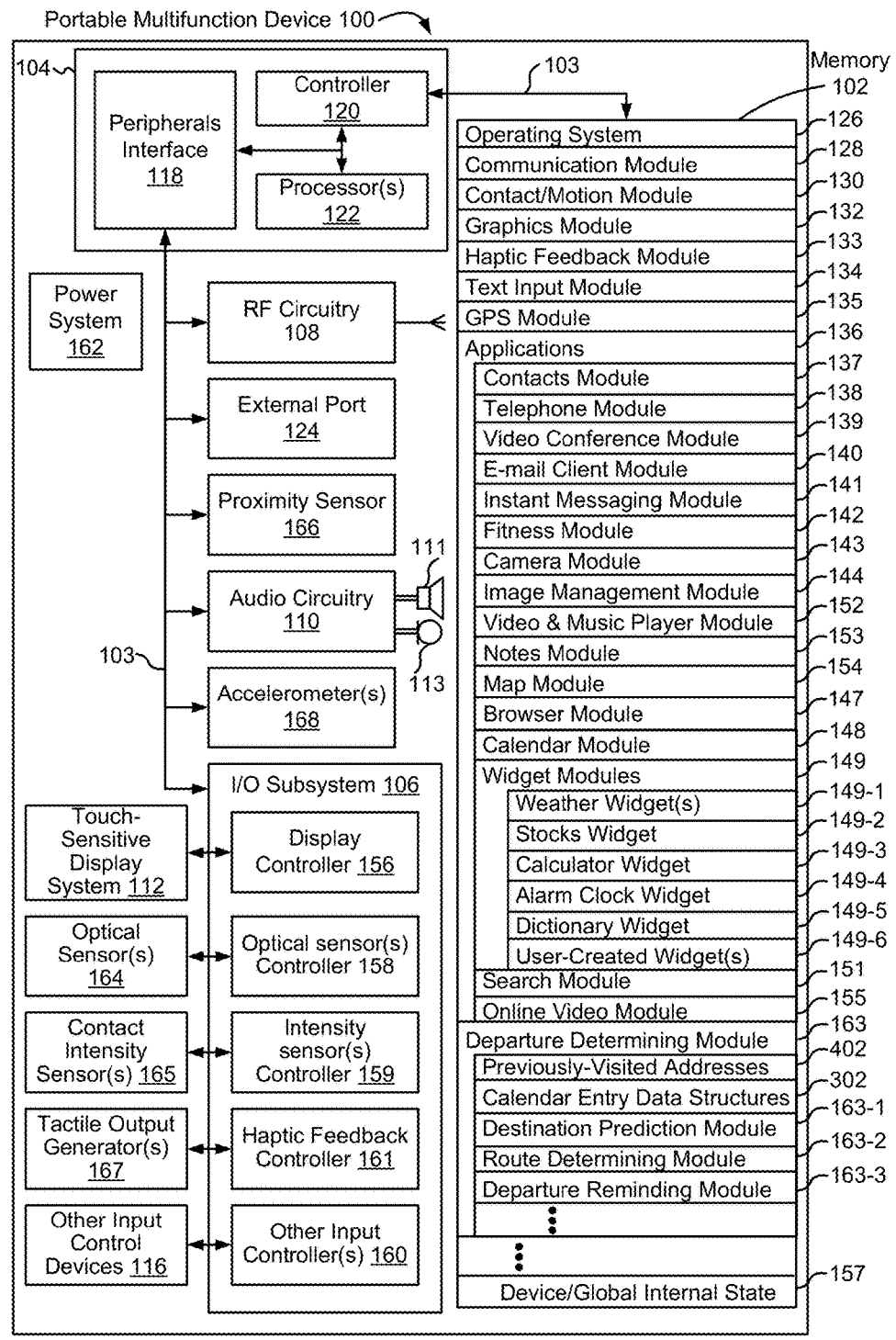
FIG. 1A is a high-level block diagram of a computing device with a touch-sensitive display, in accordance with some embodiments.
Figure 1B:
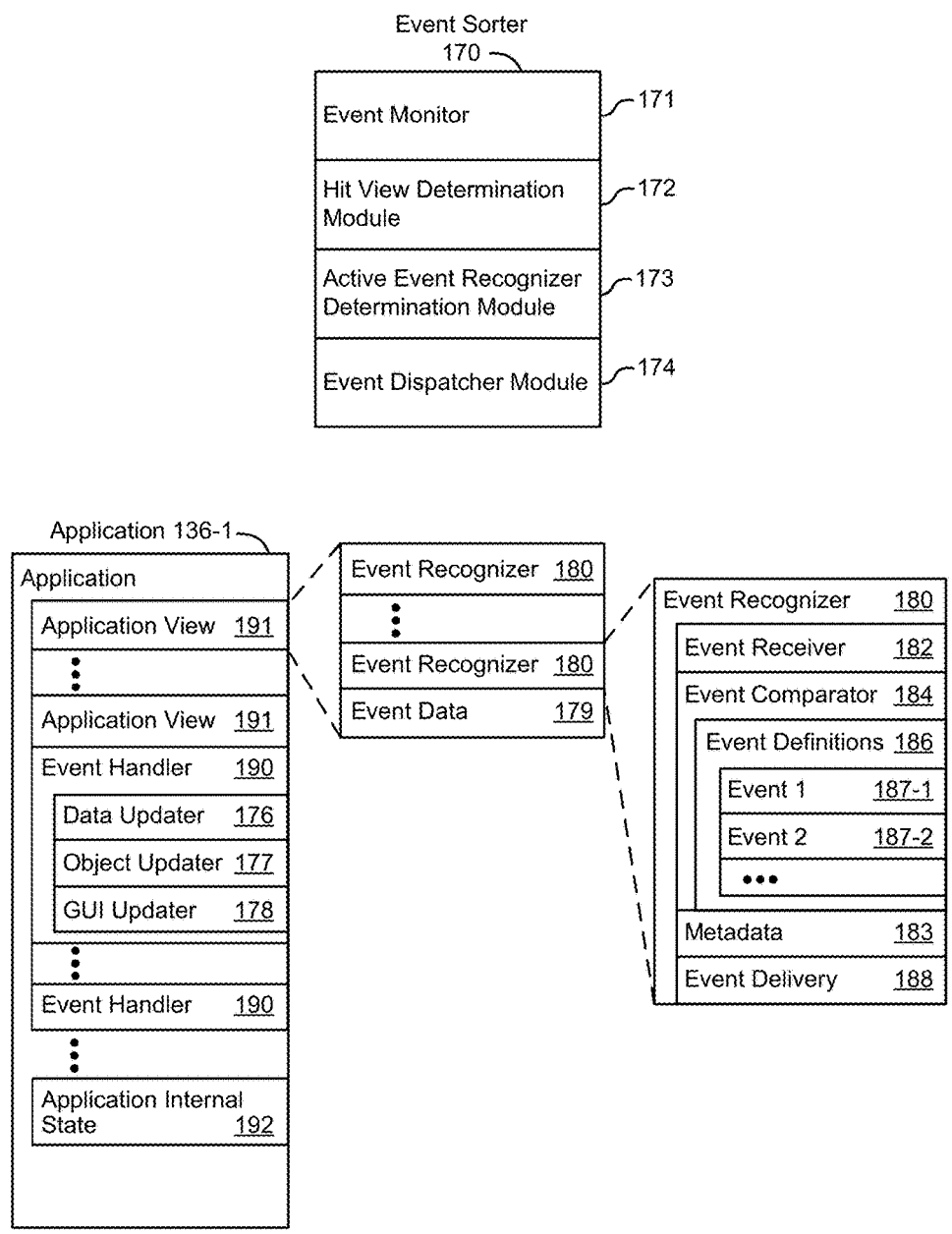
FIG. 1B is a block diagram of exemplary components for event handling, in accordance with some embodiments.
Figure 2:
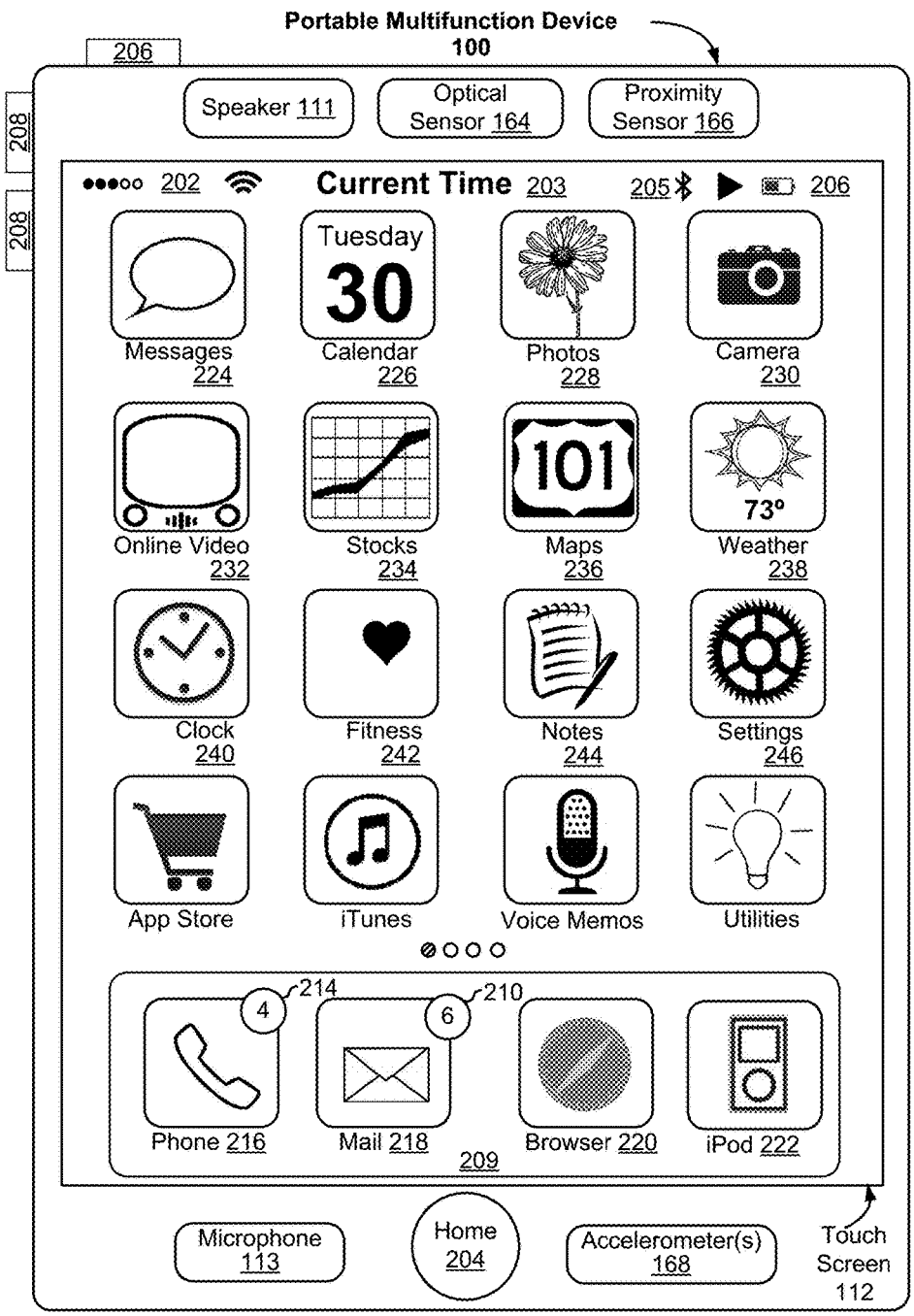
FIG. 2 is a schematic of a touch screen used to illustrate a user interface for a menu of applications, in accordance with some embodiments.

Below, FIGS. 1A-1B and 2 provide a description of exemplary devices. FIG. 8 provides a functional block diagram of an exemplary electronic device. FIGS. 3A-3B and FIGS. 4A-4B are block diagrams of exemplary data structures that are used to generate and provide intelligent time to leave reminders (these data structures are used in the method described below in reference to FIG. 6). FIG. 5 is a block diagram illustrating an exemplary system for generating and providing intelligent time to leave reminders (the exemplary system is used in the method described below in reference to FIG. 6). FIG. 5 is a flowchart depicting a method of generating and providing intelligent time to leave reminders. FIGS. 7A-7F are schematics of a touch-sensitive display used to illustrate exemplary user interfaces for generating and providing intelligent time to leave reminders. FIGS. 3A-3B, 4A-4B, 5, and 7A-7E are used to illustrate the methods and/or processes of FIG. 5.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The disclosure herein interchangeably refers to detecting a touch input on, at, over, on top of, or substantially within a particular user interface element or a particular portion of a touch-sensitive display. As used herein, a touch input that is detected "at" a particular user interface element could also be detected "on," "over," "on top of," or "substantially within" that same user interface element, depending on the context. In some embodiments and as discussed in more detail below, desired sensitivity levels for detecting touch inputs are configured by a user of an electronic device (e.g., the user could decide (and configure the electronic device to operate) that a touch input should only be detected when the touch input is completely within a user interface element).

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the IPHONE®, IPOD TOUCH®, and IPAD® devices from APPLE Inc. of Cupertino, Calif. Other portable electronic devices, such as laptops or tablet computers with touch-sensitive surfaces (e.g., touch-sensitive displays and/or touch pads), are, optionally, used. It should also be understood that, in some embodiments, the device is not a portable communications device, but is a desktop computer with a touch-sensitive surface (e.g., a touch-sensitive display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a fitness application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable electronic devices with touch-sensitive displays. FIG. 1A is a block diagram illustrating portable multifunction device 100 (also referred to interchangeably herein as electronic device 100 or device 100) with touch-sensitive display 112 in accordance with some embodiments. Touch-sensitive display 112 is sometimes called a "touch screen" for convenience, and is sometimes known as or called a touch-sensitive display system. Device 100 includes memory 102 (which optionally includes one or more computer-readable storage mediums), controller 120, one or more processing units (CPU's) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or a touchpad of device 100). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory (e.g., DRAM, SRAM, DDR RAM or other random access solid state memory devices) and optionally also includes non-volatile memory, such as one or more magnetic disk storage devices, flash memory devices, or other non-volatile solid-state memory devices. Memory 102 optionally includes one or more storage devices remotely located from processor(s) 122. Access to memory 102 by other components of device 100, such as CPU 122 and the peripherals interface 118, is, optionally, controlled by controller 120.

Peripherals interface 118 can be used to couple input and output peripherals of the device to CPU 122 and memory 102. The one or more processors 122 run or execute various software programs and/or sets of instructions stored in memory 102 to perform various functions for device 100 and to process data.

In some embodiments, peripherals interface 118, CPU 122, and controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, and/or Wireless Fidelity (Wi-Fi) (e.g., IEEE 802.11a, IEEE 802.11b, IEEE 802.11g and/or IEEE 802.11n).

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 connects input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons optionally include an up/down button for volume control of speaker 111 and/or microphone 113. The one or more buttons optionally include a push button.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, a sensor or a set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to an area under a finger of the user.

Touch screen 112 optionally uses LCD (liquid crystal display) technology, LPD (light emitting polymer display) technology, or LED (light emitting diode) technology, or OLED (organic light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the IPHONE®, IPOD TOUCH®, and IPAD® from APPLE Inc. of Cupertino, Calif.

Touch screen 112 optionally has a video resolution in excess of 400 dpi. In some embodiments, touch screen 112 has a video resolution of at least 600 dpi. In other embodiments, touch screen 112 has a video resolution of at least 1000 dpi. The user optionally makes contact with touch screen 112 using any suitable object or digit, such as a stylus or a finger. In some embodiments, the user interface is designed to work primarily with finger-based contacts and gestures. In some embodiments, the device translates the finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)), and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen 112 on the front of the device, so that the touch-sensitive display is enabled for use as a viewfinder for still and/or video image acquisition. In some embodiments, another optical sensor is located on the front of the device so that the user's image is, optionally, obtained for videoconferencing while the user views the other video conference participants on the touch-sensitive display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in 1/0 subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch-sensitive display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, departure determining module 163 (optionally including one or more of previously-visited addresses 402, calendar entry data structure 302, destination prediction module 163-1, route determining module 163-2, and/or departure reminding module 163-3), as shown in FIG. 1A. Device/global internal state 157 includes one or more of: active application state, indicating which applications, if any, are currently active; display state, indicating what applications, views or other information occupy various regions of touch-sensitive display 112; sensor state, including information obtained from the device's various sensors and input control devices 116; and location information concerning the device's location and/or attitude (i.e., orientation of the device).

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on some embodiments of IPOD devices from APPLE Inc. In other embodiments, the external port is a multi-pin (e.g., 8-pin) connector that is the same as, or similar to and/or compatible with the 8-pin connector used in LIGHTNING connectors from APPLE Inc.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/ motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has selected or "clicked" on an affordance). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-sensitive display can be set to any of a large range of predefined thresholds values without changing the trackpad or touch-sensitive display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and, in some embodiments, subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinating data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications ("apps") 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- fitness module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, website creation applications, disk authoring applications, spreadsheet applications, JAVA-enabled applications, encryption, digital rights management, voice recognition, widget creator module for making user-created widgets 149-6, and voice replication.

In conjunction with touch screen 112, display controller 156, contact module 130, graphics module 132, and text input module 134, contacts module 137 is, optionally, used to manage an address book or contact list (e.g., stored in contacts module 137 in memory 102), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact module 130, graphics module 132, and text input module 134, telephone module 138 is, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XIVIPP, SIMPLE, or IMPS for Internet-based instant messages), to receive instant messages and to view received instant messages. In some embodiments, transmitted and/or received instant messages optionally include graphics, photos, audio files, video files, and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and video and music player module 152, fitness module 142 includes executable instructions to create workouts (e.g., with time, distance, and/or calorie burning goals), communicate with workout sensors (sports devices such as a watch or a pedometer), receive workout sensor data, calibrate sensors used to monitor a workout, select and play music for a workout, and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, a widget creator module (not pictured) is, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an IPOD from APPLE Inc.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 is, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

As pictured in FIG. 1A, portable multifunction device 100 also includes a departure determining module 163 for coordinating departure determining operations on device 100 (e.g., retrieving data from previously-visited addresses 402 or calendar entry data structures 302 and using the retrieved data to create a time to leave reminder). Departure determining module 163 optionally includes the following modules (or sets of instructions), or a subset or superset thereof:

previously-visited addresses 402 for storing information about addresses (or GPS coordinates corresponding to addresses) that have been previously-visited by a user of the device 100;

calendar entry data structures 302 for storing information about calendar entries associated with a user of the device 100;

destination prediction module 163-1;

route determining module 163-2; and departure reminding module 163-3.

In conjunction with GPS module 135, operating system 126, I/O subsystem 106, previously-visited addresses 402, calendar entry data structures 302, map module 154, and calendar module 148, destination prediction module 163-1 includes executable instructions to scan calendar entries (e.g., one or more records stored in the calendar entry data structures 302) and predict a destination for a respective calendar entry based on a previously-visited address (e.g., a previously-visited address stored in the previously-visited addresses 402).

In conjunction with GPS module 135, operating system 126, I/O subsystem 106, previously-visited addresses 402, calendar entry data structures 302, map module 154, and calendar module 148, route determining module 163-2 includes executable instructions to determine one or more possible routes (e.g., walking, biking, driving, using public transportation, etc.) to a particular destination.

Figure 7A:
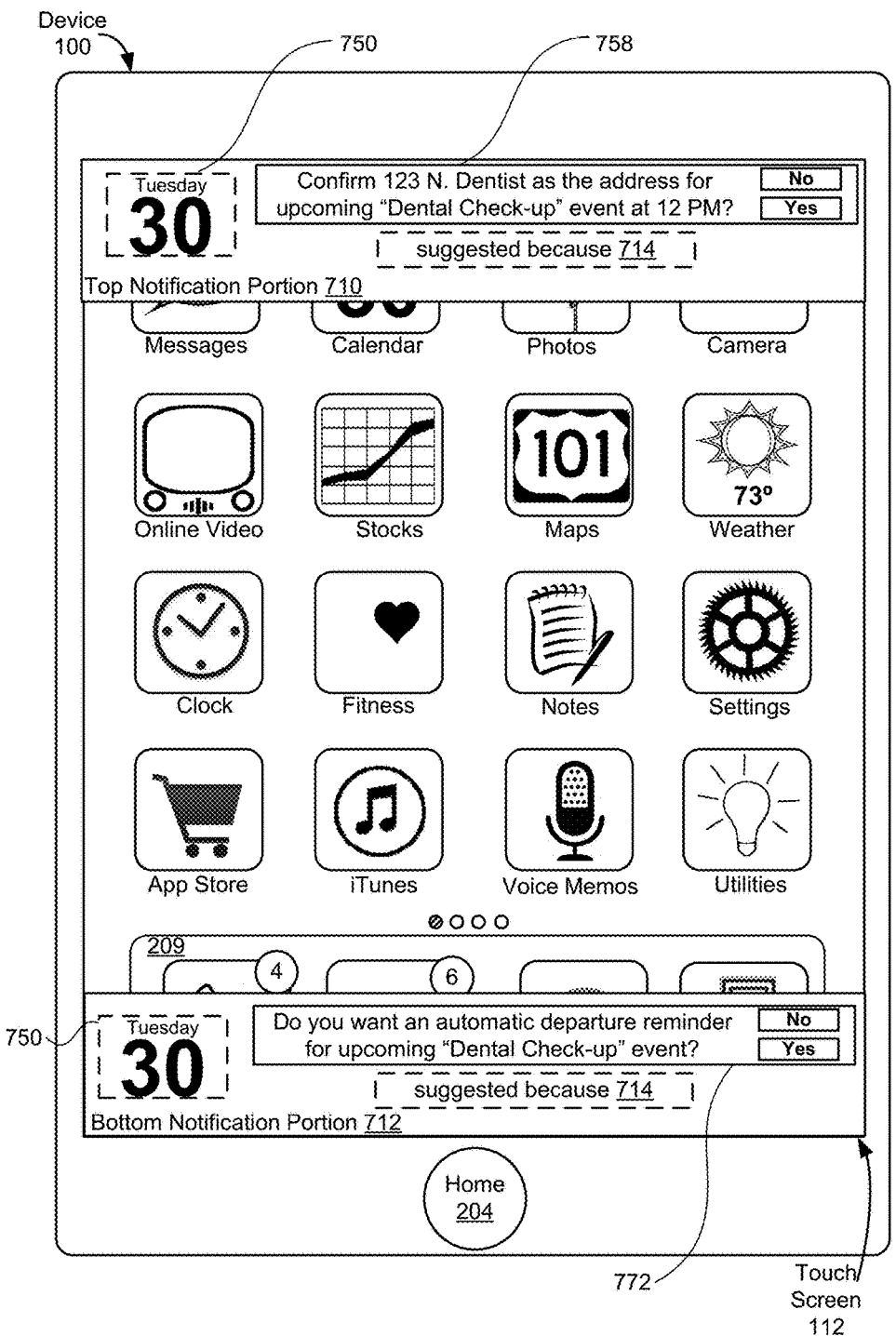
FIGS. 7A-7F are schematics of a touch-sensitive display used to illustrate generation and provision of intelligent time to leave reminders, in accordance with some embodiments.
Figure 7B:
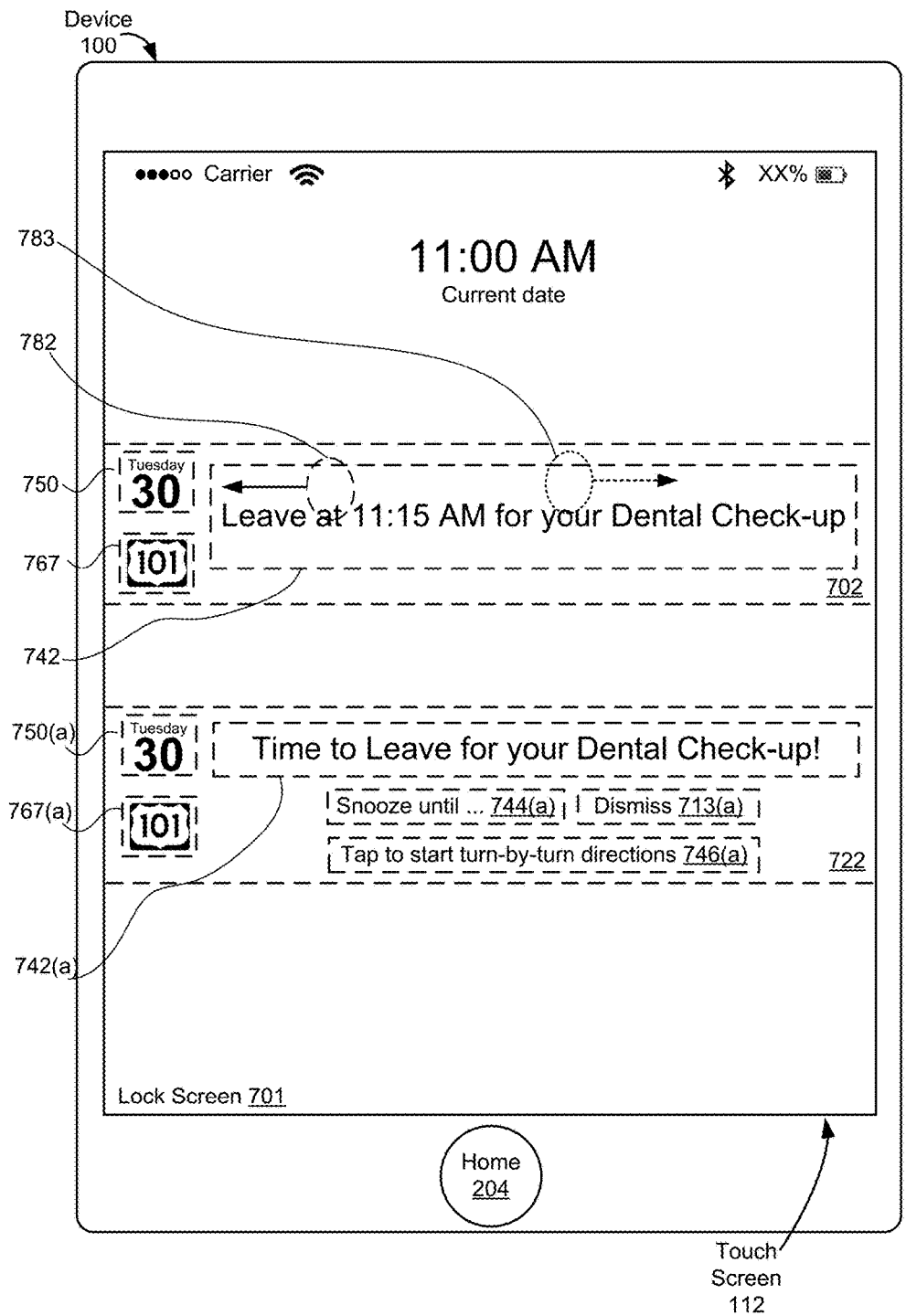
Figure 8:
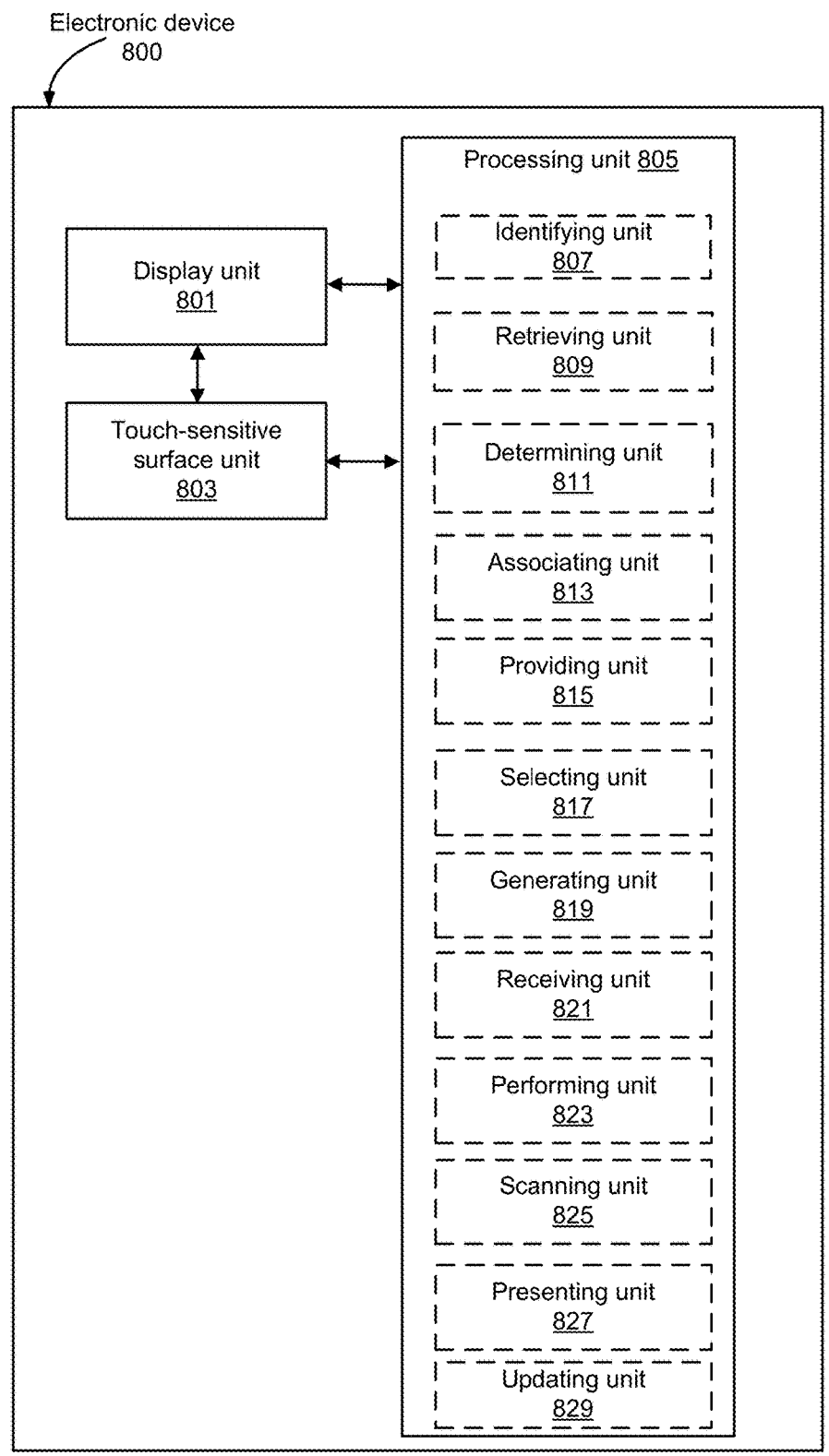
FIG. 8 is a functional block diagram of an electronic device, in accordance with some embodiments.

In conjunction with GPS module 135, operating system 126, I/O subsystem 106, previously-visited addresses 402, calendar entry data structures 302, map module 154, and calendar module 148, departure reminding module 163-3 includes executable instructions to provide a reminder to a user of the device 100 that it is time to leave for an upcoming event (e.g., an exemplary user interface object 702 with an exemplary reminder is shown in FIG. 7B).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (in FIG. 1A) includes event sorter 170 (e.g., in operating system 126) and a respective application 136-1 selected from among the applications 136 of portable multifunction device 100 (FIG. 1A) (e.g., any of the aforementioned applications stored in memory 102 with applications 136).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from portrait to landscape, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 186 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any remain active for the hit view, continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof is optionally utilized as inputs corresponding to sub-events which define an event to be recognized.

Figure 1C:
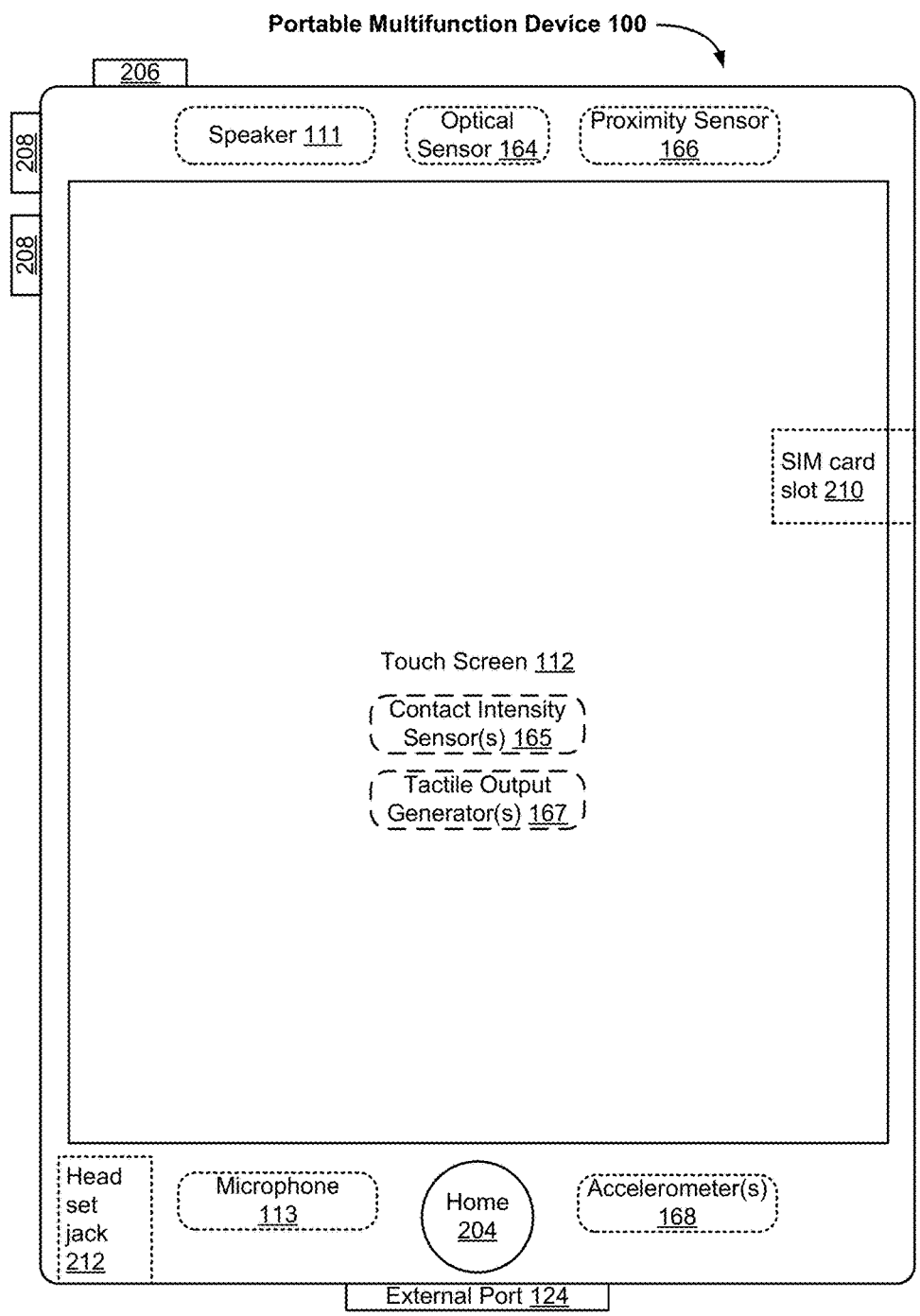
FIG. 1C is a schematic of a portable multifunction device having a touch-sensitive display, in accordance with some embodiments.

FIG. 1C is a schematic of a portable multifunction device (e.g., portable multifunction device 100) having a touch-sensitive display (e.g., touch screen 112) in accordance with some embodiments. In some embodiments, as well as others described below, a user can select one or more graphics displayed on the touch-sensitive display by making a gesture on the screen, for example, with one or more fingers or one or more styluses. In some embodiments, selection of one or more graphics occurs when the user breaks contact with the one or more graphics (e.g., by lifting a finger off of the screen). In some embodiments, the gesture optionally includes one or more tap gestures (e.g., a sequence of touches on the screen followed by liftoffs), one or more swipe gestures (continuous contact during the gesture along the surface of the screen, e.g., from left to right, right to left, upward and/or downward), and/or a rolling of a finger (e.g., from right to left, left to right, upward and/or downward) that has made contact with device 100. In some implementations or circumstances, inadvertent contact with a graphic does not select the graphic. For example, a swipe gesture that sweeps over an application affordance (e.g., an icon) optionally does not launch (e.g., open) the corresponding application when the gesture for launching the application is a tap gesture.

Device 100 optionally also includes one or more physical buttons, such as a "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

Figure 1D:
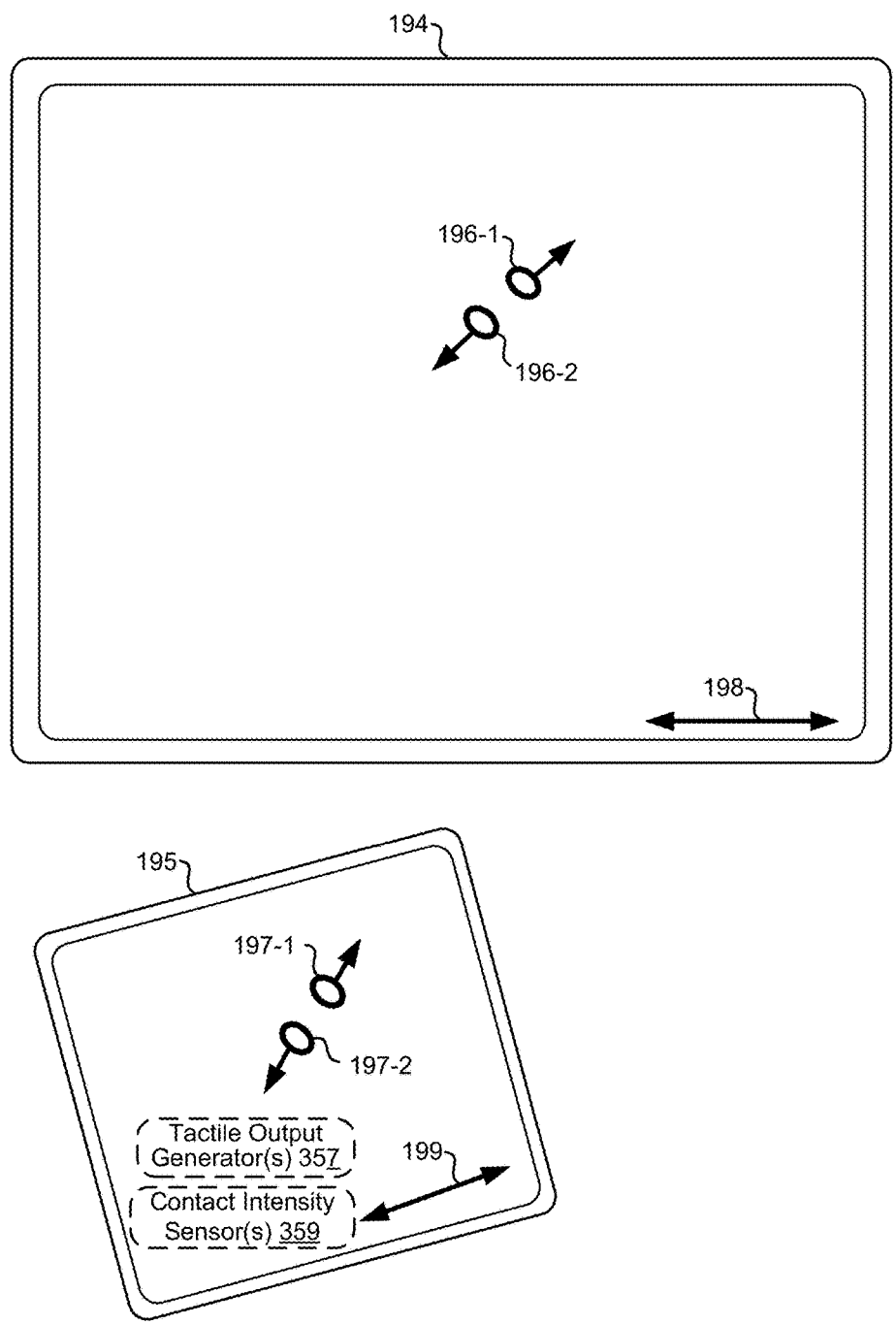
FIG. 1D is a schematic used to illustrate a computing device with a touch-sensitive surface that is separate from the display, in accordance with some embodiments.

FIG. 1D is a schematic used to illustrate a user interface on a device (e.g., device 100, FIG. 1A) with a touch-sensitive surface 195 (e.g., a tablet or touchpad) that is separate from the display 194 (e.g., touch screen 112). In some embodiments, touch-sensitive surface 195 includes one or more contact intensity sensors (e.g., one or more of contact intensity sensor(s) 359) for detecting intensity of contacts on touch-sensitive surface 195 and/or one or more tactile output generator(s) 357 for generating tactile outputs for a user of touch-sensitive surface 195.

Although some of the examples which follow will be given with reference to inputs on touch screen 112 (where the touch sensitive surface and the display are combined), in some embodiments, the device detects inputs on a touch-sensitive surface that is separate from the display, as shown in FIG. 1D. In some embodiments the touch sensitive surface (e.g., 195 in FIG. 1D) has a primary axis (e.g., 199 in FIG. 1D) that corresponds to a primary axis (e.g., 198 in FIG. 1D) on the display (e.g., 194). In accordance with these embodiments, the device detects contacts (e.g., 197-1 and 197-2 in FIG. 1D) with the touch-sensitive surface 195 at locations that correspond to respective locations on the display (e.g., in FIG. 1D, 197-1 corresponds to 196-1 and 197-2 corresponds to 196-2). In this way, user inputs (e.g., contacts 197-1 and 197-2, and movements thereof) detected by the device on the touch-sensitive surface (e.g., 195 in FIG. 1D) are used by the device to manipulate the user interface on the display (e.g., 194 in FIG. 1D) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touch-sensitive surface 195 in FIG. 1D (touch-sensitive surface 195, in some embodiments, is a touchpad)) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch-sensitive display) will indicate that the user is intending to activate the respective button (as opposed to other user interface elements shown on a display of the device).

Attention is now directed towards user interface ("UI") embodiments and associated processes that may be implemented on an electronic device with a display and a touch-sensitive surface, such as device 100.

FIG. 2 is a schematic of a touch screen used to illustrate a user interface for a menu of applications, in accordance with some embodiments. Similar user interfaces are, optionally, implemented on device 100 (FIG. 1A). In some embodiments, the user interface for the menu of applications includes the following elements, or a subset or superset thereof:

Signal strength indicator(s) 202 for wireless communication(s), such as cellular and Wi-Fi signals;
Time 203;
Bluetooth indicator 205;
Battery status indicator 206;
Tray 209 with icons for frequently used applications, such as:
  Icon 216 for telephone module 138, labeled "Phone," which optionally includes an indicator 214 of the number of missed calls or voicemail messages;
  Icon 218 for e-mail client module 140, labeled "Mail," which optionally includes an indicator 210 of the number of unread e-mails;
  Icon 220 for browser module 147, labeled "Browser;" and
  Icon 222 for video and music player module 152, also referred to as IPOD (trademark of APPLE Inc.) module 152, labeled "iPod;" and
Icons for other applications, such as:
  Icon 224 for IM module 141, labeled "Messages;"
  Icon 226 for calendar module 148, labeled "Calendar;"
  Icon 228 for image management module 144, labeled "Photos;"
  Icon 230 for camera module 143, labeled "Camera;"
  Icon 232 for online video module 155, labeled "Online Video"
  Icon 234 for stocks widget 149-2, labeled "Stocks;"

Icon 236 for map module 154, labeled "Maps;"

Icon 238 for weather widget 149-1, labeled "Weather;"

Icon 240 for alarm clock widget 149-4, labeled "Clock;"

Icon 242 for fitness module 142, labeled "Fitness;"

Icon 244 for notes module 153, labeled "Notes;"

Icon 246 for a settings application or module, which provides access to settings for device 100 and its various applications; and Other icons for additional applications, such as App Store, iTunes, Voice Memos, and Utilities.

It should be noted that the icon labels illustrated in FIG. 2 are merely exemplary. Other labels are, optionally, used for various application icons. For example, icon 242 for fitness module 142 is alternatively labeled "Fitness Support," "Workout," "Workout Support," "Exercise," "Exercise Support," or "Health." In some embodiments, a label for a respective application icon includes a name of an application corresponding to the respective application icon. In some embodiments, a label for a particular application icon is distinct from a name of an application corresponding to the particular application icon.

Figures 3A, 3B:
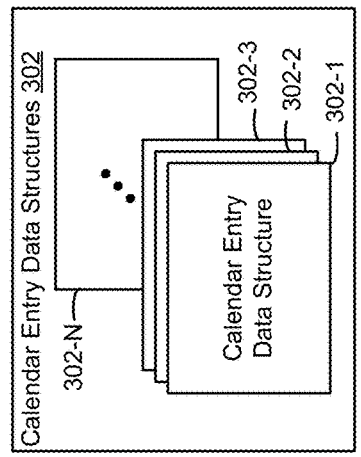
FIGS. 3A-3B are block diagrams illustrating data structures for storing calendar entries, in accordance with some embodiments.

FIGS. 3A-3B are block diagrams illustrating data structures for storing calendar entries (e.g., for a particular user of the device 100), in accordance with some embodiments. As shown in FIG. 3A, calendar entry data structures 302 include a collection of data structures 302, optionally implemented as a collection of tables for each particular user of the device 100, that each store calendar entries associated with a particular user of the device 100 (e.g., calendar entry data structure 302-1 stores calendar entries for user 1 of the device 100 and calendar entry data structure 302-2 stores calendar entries for user 2 of the device 100). In some embodiments, each table (e.g., table 302-1, 302-2, 302-3 . . . 302-N) in the collection of calendar entry data structures stores calendar entries for more than one user of the device.

Figure 7C:
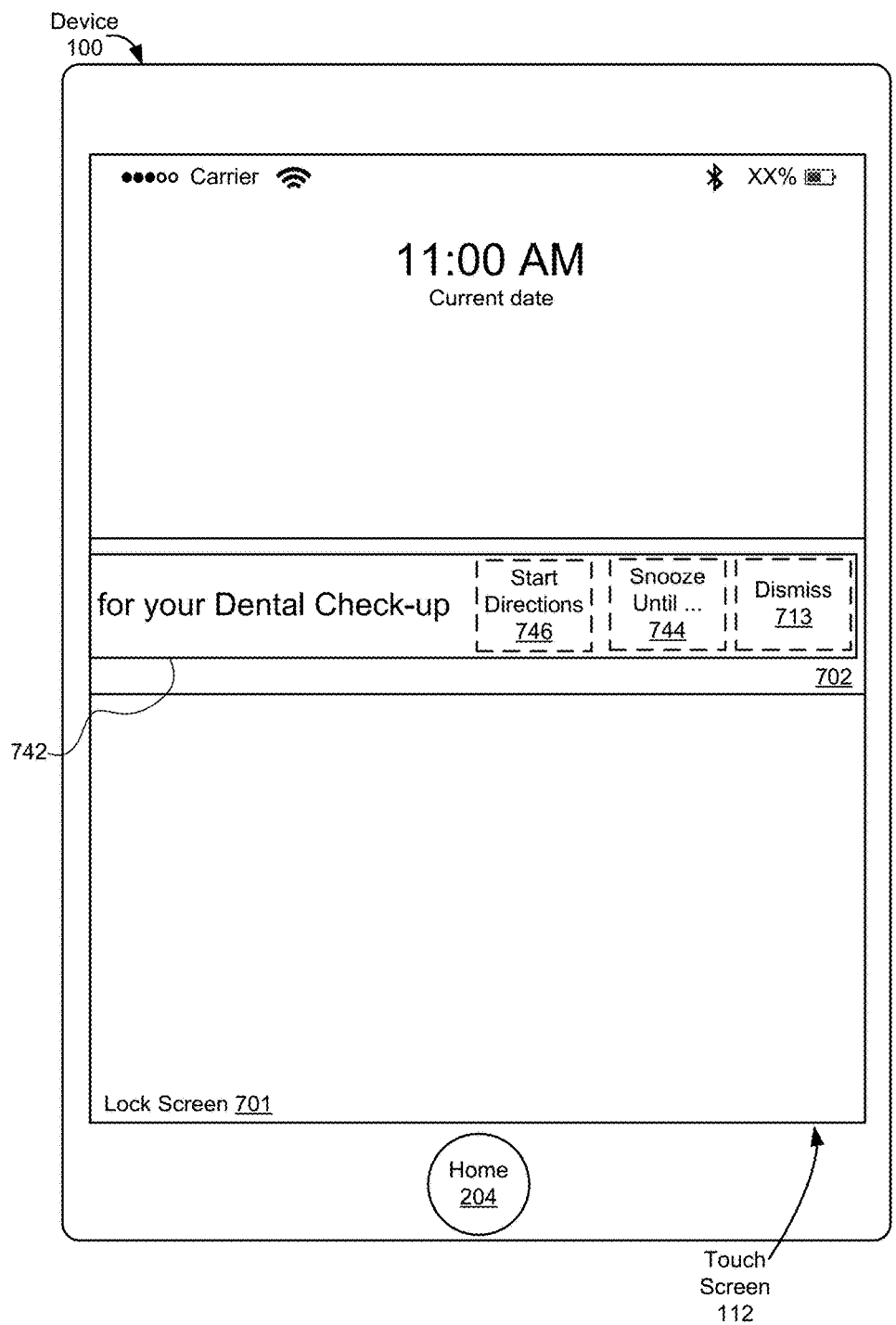
Figure 7D:
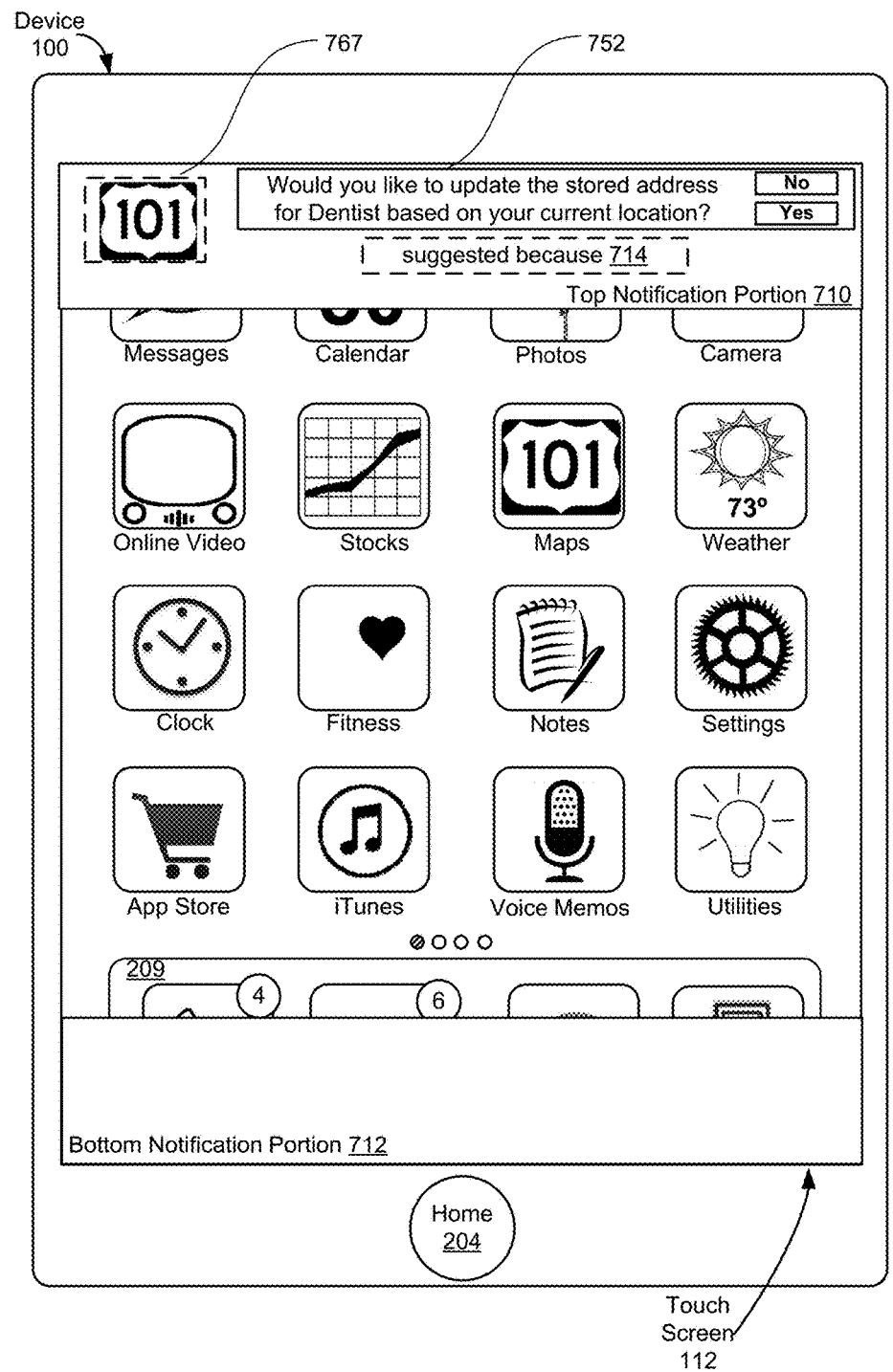
Figure 7E:
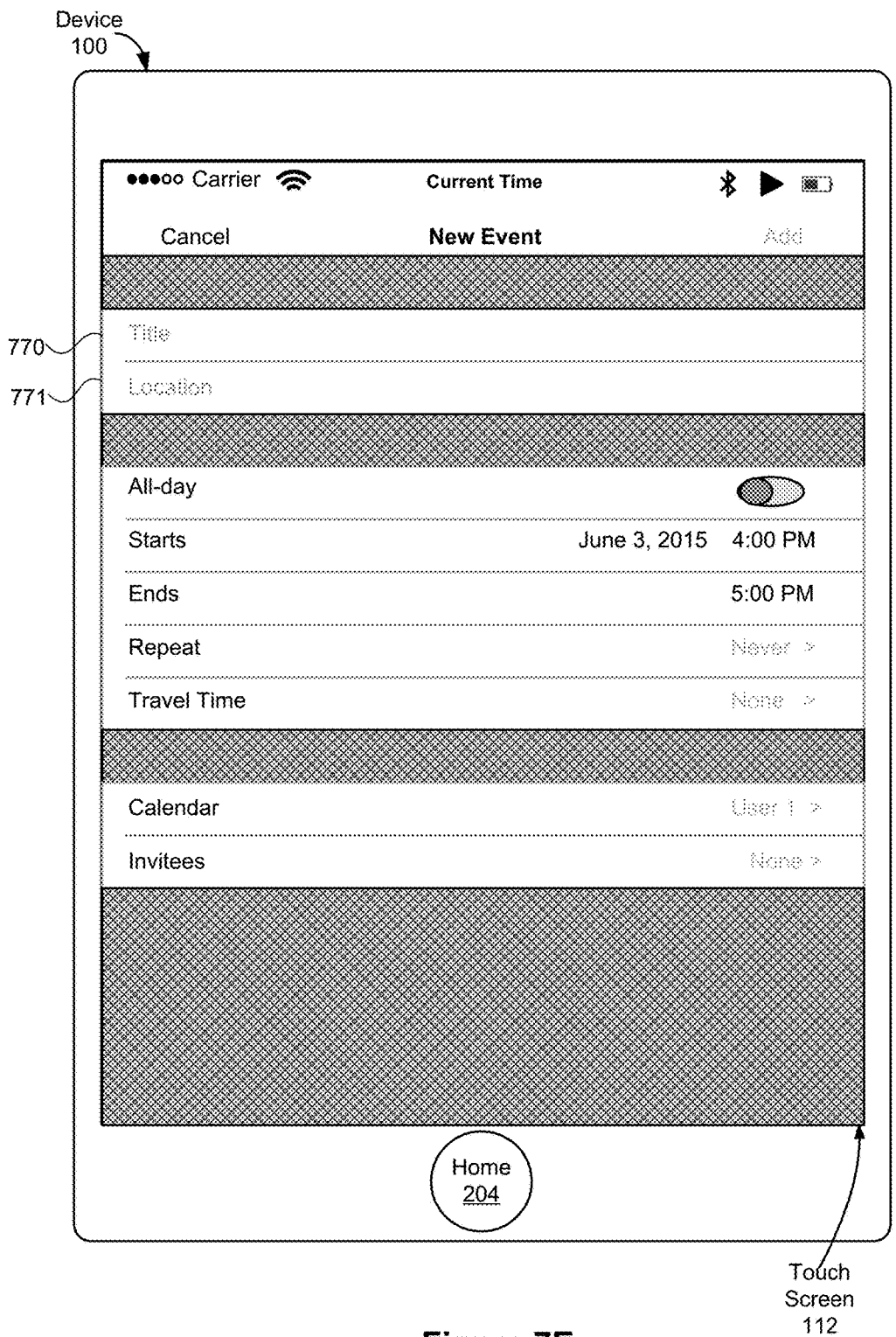
Figure 7F:
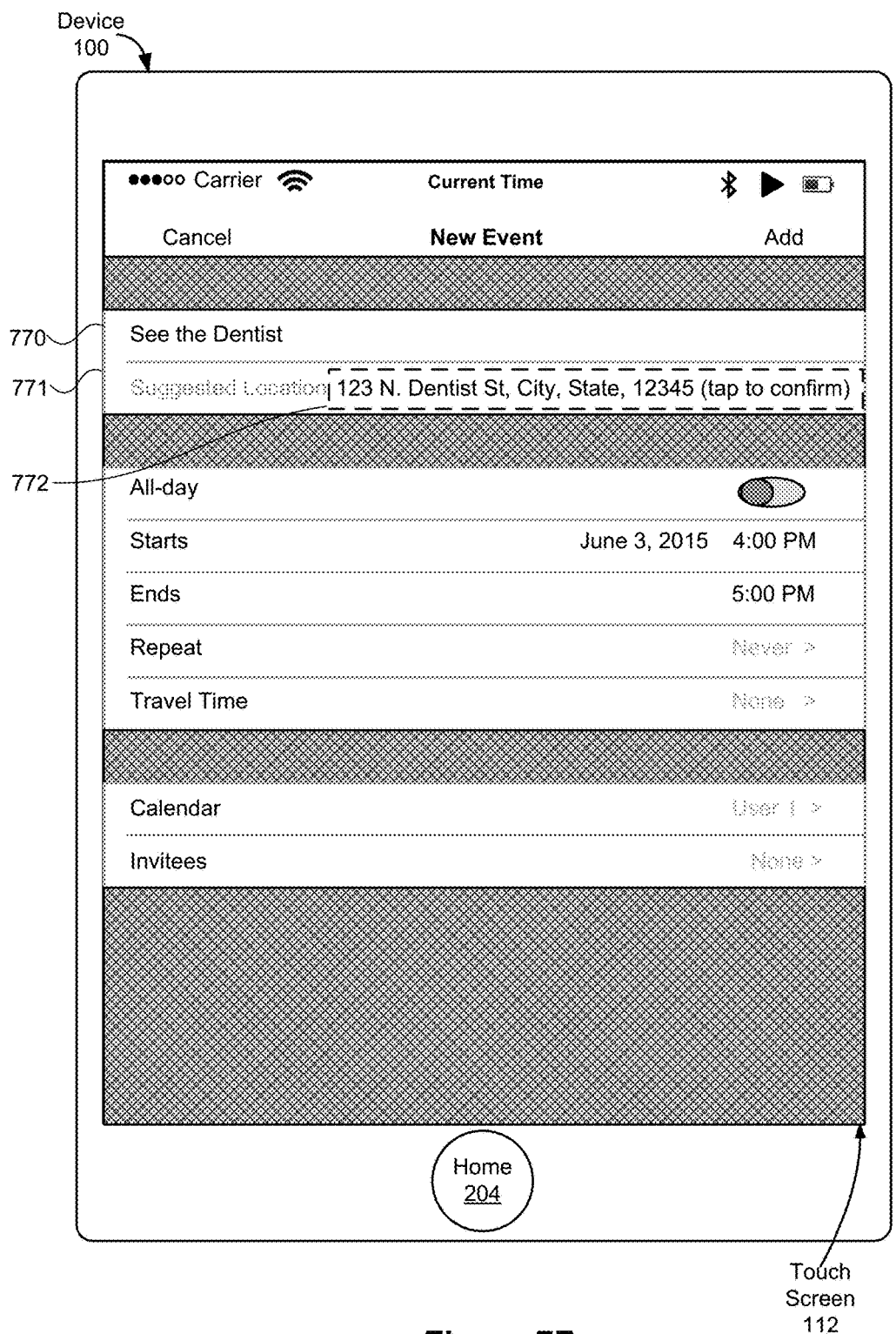

In some embodiments, one or more calendar entry data structures 302 (e.g., calendar entry data structure 302-1, FIG. 3B) are used for storing calendar entries associated with a user of the device 100. As illustrated in FIG. 3B, calendar entry data structure 302-1 contains data (e.g., calendar entry ID, title, location, date and time, departure time reminder, and alert) associated with calendar entries for user 1. In some embodiments, the data is stored in individual records 312-1, 312-2, 312-3 through 312-N. In some embodiments, a header field 312-0 is used to describe each field of information associated with each of the respective records. Header 312-0, in some embodiments, contains a brief description of each field of information (e.g., each field associated with each of the records) stored within the table. As shown in FIG. 3B, header 312-0 indicates that each record 312-1, 312-2, 312-3 through 312-N stores the following information and data structures, or a subset or superset thereof:

a value for a "calendar entry ID" field that uniquely identifies each particular record (e.g., records 312-1 through 312-N);

a value for a "title" field that corresponds to descriptive text about a calendar entry (e.g., descriptive text provided by a user at the time of creating a calendar entry, such as the text provided in field 770 of FIG. 7E). In some circumstances, the title includes an identifier that corresponds to a geographic location (e.g., "Go to Dentist" of record 312-3 includes the identifier "Dentist" that corresponds to the geographic location for a dentist's office (such as the previously-visited address for the "Dentist's Office" that is associated with/ identified by record 412-1 of previously-visited address data structure 402-1));

a value for a "location" field that corresponds to information about the location associated with a calendar entry (e.g., information provided by a user at the time of creating a calendar entry (e.g., provided in field 771 of FIG. 7E)). In some circumstances, the user creates the calendar entry without providing (or providing only incomplete) information about the location (e.g., record 312-1 has a NULL value in the location field, indicating that the user did not provide any information about the location for the calendar entry associated with record 312-1);

a value for a "date and time" field that corresponds to information about the start and end times for a calendar entry (e.g., information provided by a user at the time of creating the calendar entry (e.g., provided in the "All-Day," "Starts," "Ends," and "Repeat" sections illustrated in FIGS. 7E-7F));

a value for a "departure time reminder" field that is automatically, and without human intervention, populated by the device 100 (or a component thereof, such as the departure determining module 163) based on a previously-visited address associated with a user (e.g., because records 312-1 and 312-2 each contain the same identifier in a portion of the title field ("Dentist"), then the previously-visited address associated with record 312-3 (e.g., record 412-1 of FIG. 4B) can be automatically used to generate a departure time reminder (as discussed in more detail below in reference to FIG. 6)). In some embodiments or circumstances, the value for the departure time reminder further includes information about a best route for reaching the previously-visited address (e.g., as determined by route determining module 163-2); and a value for an "alert" field that corresponds to information about an alert or reminder for a calendar entry (e.g., information provided by a user at the time of creating a calendar entry, such as "30 min. before" as shown for record 312-1).

In some embodiments, calendar entry data structure 302-1 includes fields in addition to the fields described above, such as a timestamp field that identifies when a respective calendar entry was created and/or stored in the table 302-1 and/or a related addresses field that includes one or more address ID values (FIG. 4B) that correspond to previously-visited addresses that are associated with the respective calendar entry.

As shown in FIG. 3B, the calendar entry data structure 302-1 includes records 312-1, 312-2, 312-3 through 312-N. As one example of the information stored in an exemplary record in the calendar entry data structure 302-1, record 312-1 stores a value of "1" in the calendar entry ID field, a value of "Go to Dentist" in the title field, a NULL value in the location field, a value of "6/12/15, 12 PM-2 PM" in the date and time field, a value of "30 min. before" in the alert field, and a NULL value in the departure time reminder field. In some embodiments, a NULL value for the departure time reminder field provides an indication to the device (or to a component thereof, such as departure determining module 163) that a departure time reminder has not yet been created (as explained below with reference to operation 602 of FIG. 6).

Although illustrated as a particular implementation of a data structure (e.g., a table), the data structures of FIGS. 3A-3B, in some embodiments, are implemented in XML files, tables within a relational database, text files, and/or any other suitable format for storing data.

Figures 4A, 4B:
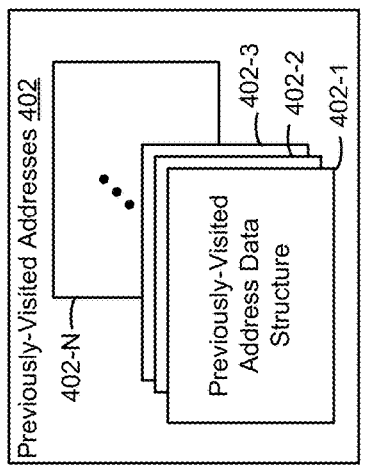
FIGS. 4A-4B are block diagrams illustrating data structures for storing previously-visited addresses, in accordance with some embodiments.
Figure 5:
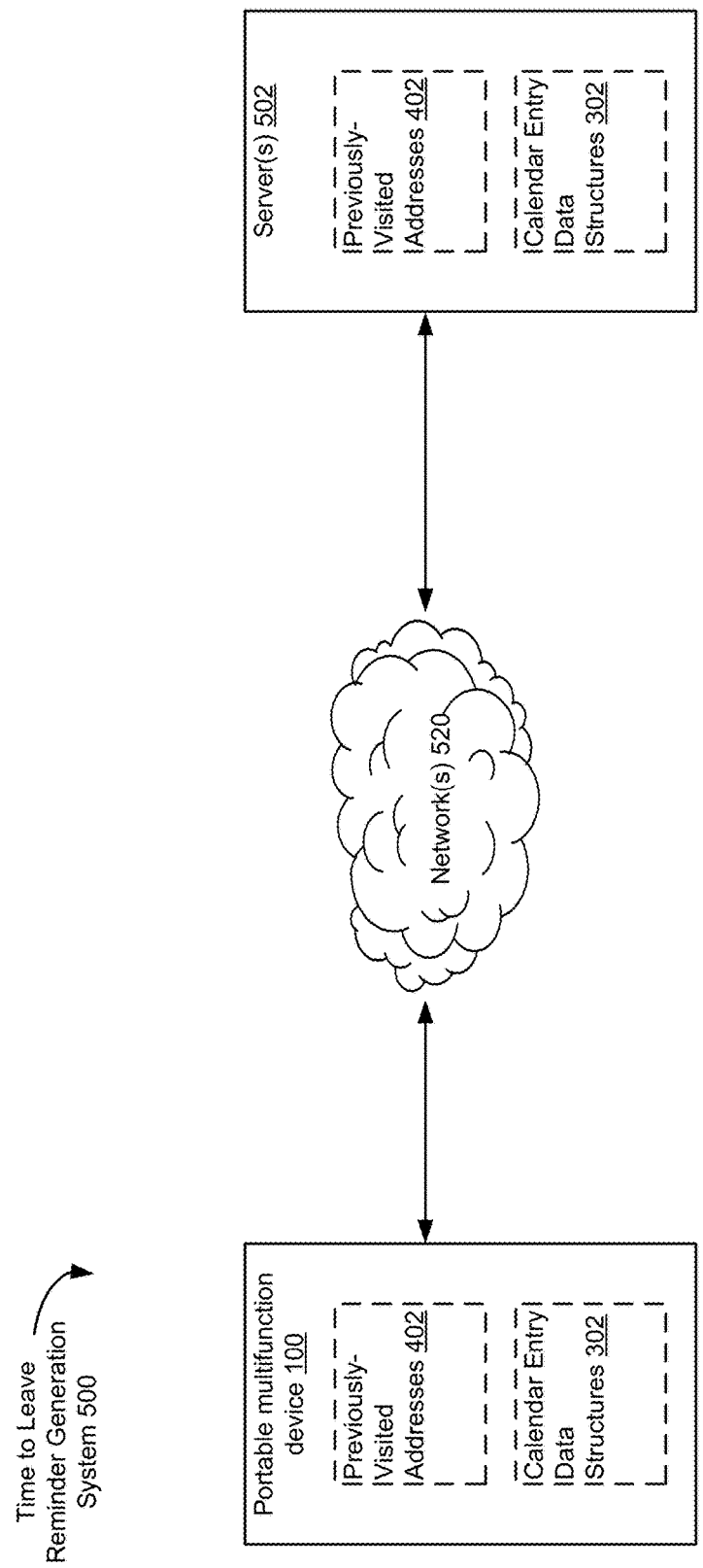
FIG. 5 is a block diagram illustrating an exemplary time to leave reminder generating system, in accordance with some embodiments.

FIGS. 4A-4B are block diagrams illustrating data structures for storing previously-visited addresses (e.g., for a particular user of the device 100), in accordance with some embodiments. As shown in FIG. 4A, previously-visited address data structures 402 include a collection of data structures 402, optionally implemented as a collection of tables for each particular user of the device 100, that each store previously-visited addresses associated with a particular user of the device 100 (e.g., previously-visited address data structure 402-1 stores previously-visited addresses for user 1 of the device 100 and previously-visited address data structure 402-2 stores previously-visited addresses for user 2 of the device 100). In some embodiments, each table (e.g., table 402-1, 402-2, 402-3 . . . 402-N) in the collection of calendar entry data structures stores previously-visited addresses for more than one user of the device.

In some embodiments, one or more previously-visited address data structures 402 (e.g., previously-visited address data structure 402-1, FIG. 4B) are used for storing previously-visited addresses associated with a user of the device 100. As illustrated in FIG. 4B, previously-visited address data structure 402-1 contains data (e.g., address ID, name, arrival address, departure address, associated items, and arrival time) associated with addresses that have been previously visited by user 1. In some embodiments, the data is used to generate accurate time to leave reminders for an upcoming event (e.g., calendar entries, events referenced in a text message, etc.) that does not include location details by identifying a previously-visited address that corresponds to the upcoming event. In some embodiments, the data is stored in individual records 412-1, 412-2, 412-3 through 412-N. In some embodiments, a header field 412-0 is used to describe each field of information associated with each of the respective records. Header 412-0, in some embodiments, contains a brief description of each field of information (e.g., each field associated with each of the records) stored within the table. As shown in FIG. 4B, header 412-0 indicates that each record 412-1, 412-2, 412-3 through 412-N stores the following information and data structures, or a subset or superset thereof:

a value for an "address ID" field that uniquely identifies a respective record associated with a particular previously-visited address (e.g., "1" is the value stored in the address ID field for record 412-1);

a value for a "name" field that corresponds to a textual description of a particular previously-visited address (e.g., "Dentist's Office" is the value stored in the name field for record 412-1). In some embodiments or circumstances the value for the name field is determined automatically, and without human intervention, based on identifiers associated with the corresponding record (e.g., because record 412-1 is associated with calendar entry 3 and because calendar entry 3 (record 312-3 of calendar entry data structure 302-1) includes the identifier "Dentist," then the device uses the same identifier when creating the value for the name field for the record 412-1). In some embodiments, the value for the name field is a term that is related to the identifier (if the identifier is "Dentist," then the related terms include, e.g., teeth, tooth, teeth-cleaning, oral-hygienist, orthodontist, periodontist, and the like);

a value for an "arrival address" field that includes information that identifies an address (e.g., a street address, GPS coordinates, or the like) that corresponds to a geographic destination reached by a user (e.g., if the user had a calendar entry for dentist's office, but without any location data identifying an address for the dentist, then, upon reaching a particular address at the time identified in the calendar entry, a record in the previously-visited address data structure 402-1 is updated to store the particular address as the arrival address);

a value for an optional "departure address" field that includes information that identifies an address (e.g., a street address, GPS coordinates, or the like) corresponding to a geographic location for a user at the time they left to reach a particular arrival address (e.g., if the user had a calendar entry for a dental appointment and leaves from a particular address at a time that indicates they are headed for the dental appointment, then, upon reaching the appointment at the time identified in the calendar entry, a record in the previously-visited address data structure 402-1 is updated to store the particular address as the departure address);

a value for an "associated items" field that includes information identifying one or more related items (e.g., content items that include the identifier (e.g., "Dentist") that is associated with the respective record, such as related messages (e.g., emails) that include the identifier ("I'm heading to the dentist now"), related calendar entries ("a calendar entry with a value for the title field of "Check-up with Dentist" as shown for record 312-3 of FIG. 3B), and the like); and a value for an optional "arrival time" field that includes information identifying a time at which a user reached the geographic location corresponding to the arrival address.

In some embodiments, previously-used addresses data structure 402-1 includes fields in addition to the fields described above, such as a "departure time" field that includes information identifying when a user left for the arrival address and/or a "route used" field that includes information that identifies the route traveled by the user between the departure address and the arrival address. In some embodiments, these additional fields are used to help the device predict patterns associated with the user (e.g., to identify and predict a most-used route or the most common departure time for the user).

As shown in FIG. 4B, the previously-visited address data structure 402-1 includes records 412-1 through 412-N. As one example of the information stored in an exemplary record in the previously-visited address data structure 402-1, record 412-1 stores a value of "1" in the address ID field, a value of "Dentist" in the title field, a value of "123 N. Dentist St, City, State, 12345" in the arrival address field, a value of "88 W. 2nd, City, State 12345" in the departure address field, a value of "Calendar Entry 3, Message 23" in the associated items field, and a value of "5/12/14, 11:15 AM" in the arrival time field. In some embodiments, the records within the previously-visited address data structure 402-1 are created at predetermined time intervals (e.g., hourly, every four hours, daily, when the device is idle, etc.).

In some embodiments, the previously-visited address data structures 402 are pre-populated during a background process that executes on the device 100 (as explained below in reference to operations 620 and 622 of FIG. 6).

In some embodiments, the previously-visited addresses 402 also store information about privacy settings associated with users of the device 100. For example, the users of device 100 are able to configure privacy settings associated with the storage of previously-visited addresses. In some embodiments, users are able to configure data collection settings for all information contained within each record in the previously-visited address data structures 402 (e.g., name, arrival address, departure address, associated items, arrival time, etc.). For example, a user can configure a privacy setting, for a first application, so that the device 100 (or a component thereof, such as map module 154) does not collect departure addresses, but does collect information about associated items, arrival addresses, and arrival times. As another example, for a second application (distinct from the aforementioned first application), the user can configure a privacy setting so that the device 100 (or a component thereof, such as map module 154) does not collect any information regarding previously-visited addresses. In this way, users are able to control the collection of previously-visited addresses on the device 100 and are able to select appropriate privacy settings based on their personal preferences regarding the collection of previously-visited addresses for each application available on the device 100 (e.g., each of the applications 136, FIG. 1A).

Although illustrated as a particular implementation of a data structure (e.g., a table), the data structures of FIGS. 4A-4B, in some embodiments, are implemented in XML files, tables within a relational database, text files, and/or any other suitable format for storing data.

FIG. 5 is a block diagram illustrating an exemplary time to leave reminder generation system, in accordance with some embodiments. As shown in FIG. 5, a time to leave reminder generation system 500 includes the portable multifunction device 100 and also includes one or more servers 502. The portable multifunction device 100 communicates with the one or more servers 502 over one or more networks. The one or more networks (e.g., network(s) 520) communicably connect each component of the time to leave reminder generation system 500 with other components of the time to leave reminder generation system 500. In some embodiments, the one or more networks 520 include public communication networks, private communication networks, or a combination of both public and private communication networks. For example, the one or more networks 520 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, one or more previously-visited address data structures 402 are stored on the portable multifunction device 100 and one or more other previously-visited address data structures 402 are stored on the one or more servers 502. In some embodiments, the portable multifunction device 100 stores the previously-visited address data structures 402, while in other embodiments, the one or more servers 502 store the previously-visited address data structures 402. Similarly, in some embodiments, one or more calendar entry data structures 302 are stored on the portable multifunction device 100 and one or more other calendar entry data structures 302 are stored on the one or more servers 502. In some embodiments, the portable multifunction device 100 stores the calendar entry data structures 302, while in other embodiments, the one or more servers 502 store the calendar entry data structures 302.

In embodiments in which one or more previously-visited addresses 402 tables or one or more calendar entry data structures 302 are stored on the one or more servers 502, then some of functions performed by the departure determining module 163 (and the components thereof, such as destination prediction module 163-1, route determining module 163-2, and departure reminding module 163-3) are performed at the one or more servers 502. In these embodiments, information is exchanged between the one or more servers 502 and the device 100 over the networks 520. For example, if the one or more servers 502 store previously-visited address data structures 402 for a first user, then, in some embodiments, the device 100 sends data (e.g., location data collected by the GPS module 135, FIG. 1A) associated with the first user to the one or more servers 502. In some embodiments, the one or more servers 502 then mine the received data to predict destinations for calendar entries and to generate time to leave reminders for the calendar entries (as discussed above in reference to FIGS. 4A-4B). The one or more servers 502 also send the generated time to leave reminders to the device 100 (or, alternatively, send information associated with a generated reminder for presentation at the device). In this way, calculations about when to leave can be handled by the one or more servers 502 and all that is needed to maintain the accuracy of the calculations is the occasional GPS ping from the device 100 (in this way the time to leave reminder generation system 500 is able to extend the battery life for the device 100). In some embodiments, the data that is sent to the one or more servers 502 is of limited scope, such that it contains only information pertaining to the addresses visited by the first user (as noted above, the user also configures privacy settings that cover the collection of this data and these privacy settings, in some embodiments, also allow the user to control, limit, or eliminate the exchange of data with the one or more servers 502).

Figure 6:
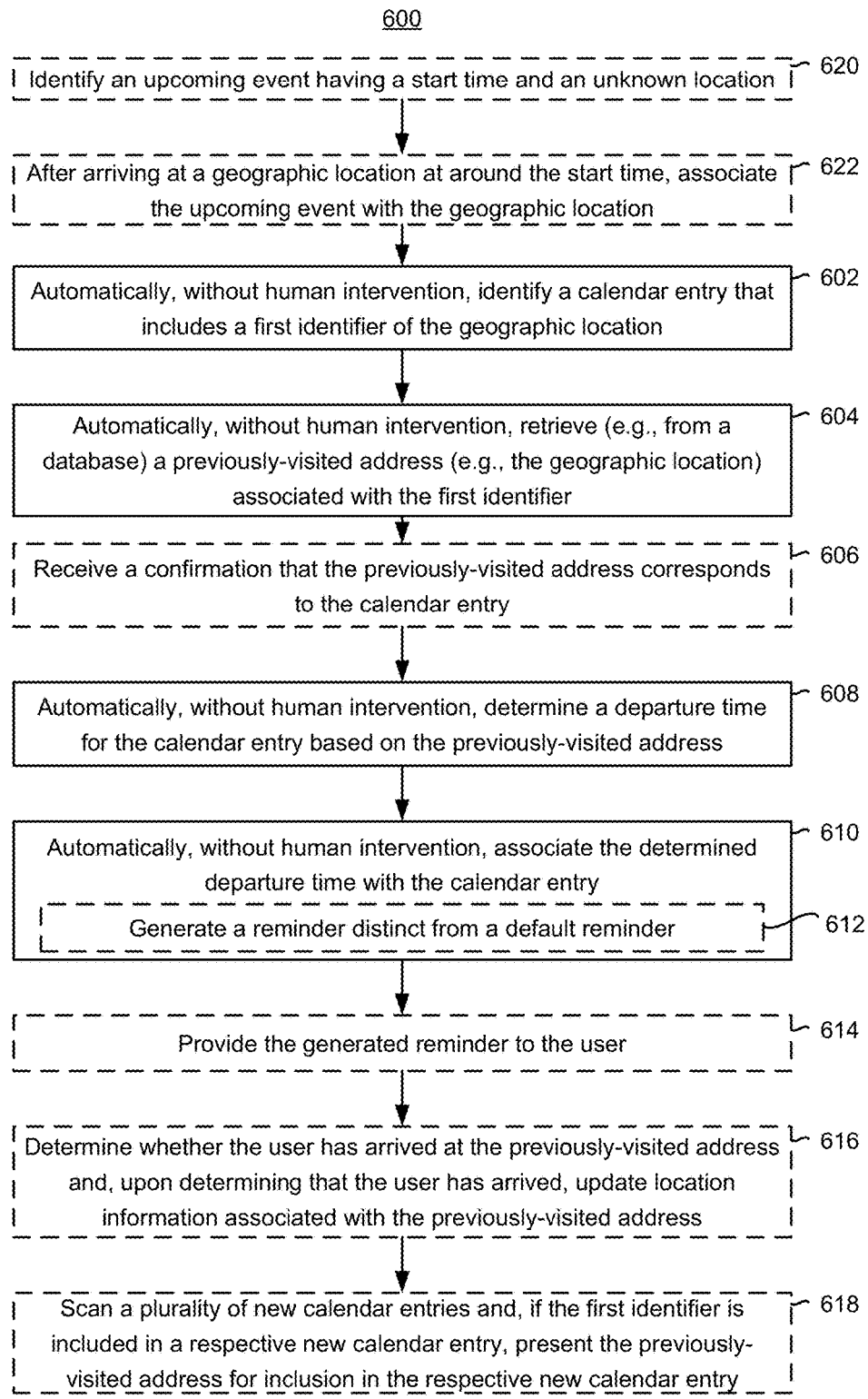
FIG. 6 is a flowchart depicting a method of generating and providing intelligent time to leave reminders, in accordance with some embodiments.

FIG. 6 is a flowchart depicting a method 600 of generating and providing intelligent time to leave reminders, in accordance with some embodiments. FIGS. 3A-3B, 4A-4B, 5, and 7A-7F are used to illustrate the methods and/or processes of FIG. 6. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 600 is performed by an electronic device (e.g., portable multifunction device 100, FIG. 1A) and/or one or more components of the electronic device (e.g., I/O subsystem 106, operating system 126, etc.). In some embodiments, the method 600 is governed by instructions that are stored in a non-transitory computer-readable storage medium and that are executed by one or more processors of a device, such as the one or more processors 122 of device 100 (FIG. 1A). For ease of explanation, the following describes method 600 as performed by the device 100. In some embodiments, with reference to FIG. 1A, the operations of method 600 are performed by or use, at least in part, a departure determining module (e.g., departure determining module 163), previously-visited addresses (e.g., previously-visited addresses 402), calendar entry data structures (e.g., calendar entry data structures 302), a destination prediction module (e.g., destination prediction module 163-1), a route determining module (e.g., route determining module 163-2), a departure reminding module (e.g., departure reminding module 163-3), a graphics module (e.g., graphics module 132), and a touch-sensitive display (e.g., touch-sensitive display system 112). Some operations in method 600 are, optionally, combined and/or the order of some operations is, optionally, changed.

As described below, the method 600 (and associated interfaces) provide(s) an intuitive way to generate and provide intelligent time to leave reminders on an electronic device with a touch-sensitive display. Method 600 streamlines processes for generating time to leave reminders by allowing users to quickly create a calendar entry with a minimal amount of textual input and then automatically, and without human intervention, determine a geographic destination corresponding to the calendar entry based only on the minimal amount of textual input. Thus, users are able to continue quickly creating calendar entries on an electronic device and, by utilizing method 600, electronic devices are able to seamlessly create intelligent time to leave reminders for the calendar entries. In this way, such method 600 helps to ensure that users reach events in a timely fashion. Thus, method 600 helps reduce the cognitive burden and the time that a user must spend to create calendar entries, thereby creating a more efficient human-machine interface. For battery-operated electronic devices, generating and providing intelligent time to leave reminders faster and more efficiently both conserves power and increases the time between battery charges (e.g., by automatically performing tasks that conventionally require extensive user interactions, such as automatically identifying a previously-visited addresses as the destination for a calendar entry that was created without specific location details).

In some embodiments, the device identifies (620) an upcoming event having a start time and an unknown location. For example, the device receives a text message of "remember your appointment with the dentist at 2:30 PM today." The content of the text message includes an upcoming event that can be identified by the device, the upcoming event having a start time of 2:30 PM today and an unknown location (i.e., unknown in the context of this one text message as the content of this message does not include a location of where the dentist's office is located). In some embodiments, after identifying the upcoming event, the device monitors (e.g., using a process that runs in the background on the device 100) a current location of the device (e.g., using GPS module 135) and, when the device is moving (e.g., as indicated by accelerometers 168 and/or GPS module 135), the device checks whether the current location is close to any dental offices. In accordance with a determination that the device is no longer moving and that the device has arrived (e.g., stopped moving) at or near a dental office (e.g., by comparing the current location of the device to information regarding the locations of dental offices as determined by map module 154), the device associates (622) the upcoming event with the geographic location. In other embodiments, at the appointment or event time, the GPS module 135 determines the device's location, and the device associates (622) the upcoming event with that location. In some embodiments, associating the upcoming event with the geographic location includes adding a record to a previously-visited address data structure 402 (e.g., record 412-1 indicates that it is associated with a message 23).

In some embodiments, the device continually monitors upcoming events (e.g., as determined by the departure determining module 163) based on content associated with one or more items on the device (e.g., text messages, email messages, voice messages, calendar entries, notes, and any other item that contains information about upcoming events). By continually monitoring upcoming events and associating the upcoming events with corresponding geographic locations, the device is able to proactively build a comprehensive database of previously-visited addresses (e.g., previously-visited address data structure 402-1, FIG. 4B) associated with particular identifier's (e.g., dentist) and the device uses that comprehensive database to generate intelligent time to leave reminders for events (e.g., calendar entries) that may not yet include any information regarding a location for the events.

In some embodiments, the device automatically, and without human intervention, identifies (602) a calendar entry including a first identifier. For example, the calendar entry is identified based on text in the title (e.g., the title includes the first identifier) of the calendar entry that generically describes a location, such as a calendar entry with a title of "Go to Dentist" (e.g., the calendar entry associated with record 312-1 includes the first identifier "Dentist," FIG. 3B). In some embodiments, the first identifier corresponds to a geographic location that is unknown (e.g., unknown to the calendar entry, as indicated by the NULL value stored in the location field of a calendar entry data structure 302-1). In some embodiments, the geographic location may be known to the device as a previously-visited address (e.g., the geographic location discussed above in reference to operations 620-622), even though the calendar entry is not (initially) aware of the previously-visited address. In some embodiments, the device resolves the unknown location by searching through previously-visited addresses using the first identifier and identifying a previously-visited address corresponding to the first identifier (as discussed below).

In some embodiments, the device automatically, and without human intervention, retrieves (604) a previously-visited address (e.g., a street address and/or GPS coordinates corresponding to the street address) associated with the first identifier (e.g., by performing a lookup in the previously-visited address 402 data structure using the identifier (e.g. Dentist, or a related term such as teeth, tooth, periodontist, orthodontist, or the like)). For example, the association between the previously-visited address and the first identifier could be due to the first identifier having previously appeared in an associated item (e.g., another calendar entry, a particular text message, a conversation including the particular text message, or an email message). One exemplary associated item is a text message saying "remember your dental checkup at 3 PM." Continuing the example, the user then departs from a first address and later arrives at a second address (e.g., the user then reaches an address for the dentist at 2:55 PM, and based on the identifier from the text message, a new record is then created in a previously-visited address data structure 402 for the identifier "Dentist," as shown for record 412-1 of previously-visited address data structure 402, FIG. 4B). Additionally, the new record of the current example includes an association with the associated item (e.g., the value for the associated items field for record 412-1 includes information that identifies the associated item, such as "message 23").

In some embodiments, the previously-visited address is retrieved (e.g., by departure determining module 163) from a database of previously-visited addresses associated with the user of the device (e.g., from a respective previously-visited address data structure 402 that is associated with the user, such as previously-visited address data structure 402-1 corresponding to User 1, FIG. 4B). In some embodiments, each previously-visited address in the database of previously-visited addresses corresponds to an address that was previously visited by the user of the electronic device (e.g., each record contained within the previously-visited address data structure 402-1 corresponds to an address that was visited by User 1). In some embodiments, retrieving the previously-visited address includes performing a lookup in the database of previously-visited addresses using the first identifier (e.g., submitting a query to the previously-visited address data structure 402-1 for all records with a value of "Dentist" in the name field). Alternatively, in some embodiments, the lookup is performed using a second identifier that is related to the first identifier (e.g., a category that includes the first identifier, such as "medical professionals"). In some of these embodiments, the second identifier is used to perform the lookup when the database query using the first identifier returns an empty or null record set.

In some embodiments, the device receives (606) a confirmation, from the user that the previously-visited address corresponds to the calendar entry. As shown in FIG. 7A, the device presents a user interface object to the user that allows the user to confirm that the previously-visited address corresponds to the calendar entry. For example, the presented user interface object is displayed within a top notification portion 710 (or, alternatively, a bottom notification portion 712), and includes an optional icon 750, a confirmation dialog 758 with selectable affordances for confirming or rejecting the correspondence between the previously-visited address and the calendar entry, and suggested because 714 that provides the user with an indication as to why the user interface object is being presented (e.g., based on the identifier "Dentist" appearing in the title for the calendar entry and the user having previously visited an address for a Dentist). In some embodiments, the icon 750 corresponds to an icon associated with a calendar application (e.g., calendar module 148, FIG. 1A) and, in response to detecting a selection of the icon 750, the device displays the calendar entry within the calendar application. In some embodiments, the confirmation dialog 758 includes a textual description requesting the confirmation, such as "Confirm 123 N. Dentist as the address for upcoming 'Dental Check-up' event at 12 PM?" In response to detecting a selection of the yes button displayed within the confirmation dialog 758, the device ceases to display the confirmation dialog 758 and updates the calendar entry to include an association with the previously-visited address (e.g., updates record 312-1, FIG. 3B, to have a value of "Address 1" for the location field instead of NULL).

In response to detecting a selection of the no button displayed within the confirmation dialog 758, the device ceases to display the confirmation dialog 758 and forgoes updating the calendar entry (e.g., does not update the value in the location field for record 312-1, FIG. 3B). Alternatively, in some embodiments, in response to detecting the selection of the no button, the device returns to retrieving operation 604 to determine whether a different previously-visited address can be identified for the calendar entry. In some embodiments, in response to detecting a selection of the suggested because affordance 714, the device displays a user interface that allows the user to configure privacy settings associated with the collection of previously-visited addresses (discussed above in reference to FIGS. 4A-4B). In some embodiments, the user interface object also includes an affordance (e.g., an "x" or a "close" affordance) that allows the user to dismiss the user interface object (similar to dismiss affordance 713, as discusses with reference to FIG. 7C).

In some embodiments, and as shown in FIG. 7A, the device receives a confirmation, from the user that a departure time should be determined for the calendar entry (e.g., prior to retrieving the previously-visited address and/or determining the departure time). As shown in FIG. 7A, the device presents a user interface object to the user that allows the user to confirm that a departure time should be automatically determined. For example, the presented user interface object is displayed within a bottom notification portion 712 (or, alternatively, a top notification portion 710), and includes an optional icon 750, a confirmation dialog 772 with selectable affordances for confirming or rejecting the creating of a departure time for the calendar entry, and suggested because 714 that provides the user with an indication as to why the user object is being presented (e.g., based on calendar entry being created without any location information, e.g., as indicated by the presence of a NULL value in the location field for a record within the calendar entry data structure 302, as is shown for record 312-1 in FIG. 3B). In some embodiments, the icon 750 corresponds to an icon associated with a calendar application (e.g., calendar module 148, FIG. 1A) and, in response to detecting a selection of the icon 750, the device displays the calendar entry within the calendar application. In some embodiments, the confirmation dialog 772 includes a textual description requesting the confirmation, such as "Do you want an automatic departure reminder for upcoming "Dental Check-up" event?" In response to detecting a selection of the yes button displayed within the confirmation dialog 772, the device ceases to display the confirmation dialog 772 and proceeds to retrieving operation 604 discussed above. In response to detecting a selection of the no button displayed within the confirmation dialog 772, the device ceases to display the confirmation dialog 772 and, optionally, flags the record corresponding to the calendar entry (e.g., record 312-1, FIG. 3B) as not requiring a departure time (e.g., updating a value in the location field to be "declined" instead of NULL). In some embodiments, in response to detecting a selection of the suggested because affordance 714, the device displays a user interface that allows the user to configure privacy settings associated with the collection of previously-visited addresses (discussed above in reference to FIGS. 4A-4B). In some embodiments, the user interface object also includes an affordance (e.g., an "x" or a "close" affordance) that allows the user to dismiss the user interface object (similar to dismiss affordance 713, as discusses with reference to FIG. 7C).

In some embodiments, the device automatically, and without human intervention, determines (608) a departure time for the calendar entry based on the previously-visited address (e.g., based on a route from the current location of the device to the previously-visited address). In some embodiments, determining the departure time includes: (i) determining a current address corresponding to the electronic device (e.g., current GPS coordinates of the device or an address that corresponds thereto), (ii) determining a route from the current address to the previously-visited address, and (iii) determining the departure time based on an amount of time to complete the route so that the user will reach the previously-visited address within a predefined amount of time (e.g., 5 minutes, 10 minutes, 15 minutes, or the like) of a start time associated with the calendar entry (e.g., the start time is retrieved from a calendar entry data structure 302, based on a value stored in the date and time field).

In some embodiments, the departure time is initially determined at a first point in time based on a default departure address associated with the user (e.g., a home address, a work address, or some other most-often-used address for the user). In some embodiments, the first point in time is the time at which the previously-visited address is retrieved, while in other embodiments, the first point in time is determined based on a start time for the calendar entry (e.g., the initial departure time is determined when the calendar entry's start time is scheduled to begin in two hours). In some embodiments, the device later (at a second point in time) checks whether the initial departure time needs to be re-calculated/ re-determined (e.g., because the user has moved a threshold distance away from the default departure address or because the calendar entry's start time is scheduled to begin in 30 minutes). In accordance with a determination that the user have moved the threshold distance away from the default departure address or that the start time for the calendar entry is within a predetermined amount of time, the device determines a new departure time for the calendar entry based on the device's current location (i.e., the device's current location is now the departure address, instead of the default departure address).

In some embodiments, the route is selected from a plurality of available routes from the current address to the previously-visited address in accordance with routing preferences associated with the user of the device. Exemplary routing preferences include road-type preferences (e.g., avoid highways), timing preferences (e.g., reach address within 15 minutes of the start time of the calendar entry), and mode of transportation preferences (e.g., prefer to walk if the weather is nice and/or the previously-visited address is within three miles of the current address). In some embodiments, the current address is stored in a previously-visited address data structure 402, in the departure address field. In some embodiments, the determining operations (i)-(iii) are performed at a predetermined time interval relative to the start time of the calendar entry (e.g., 1 day prior to the start time). In some embodiments, the determining operations (i)-(iii) are performed at a first time and then repeated at a later time (e.g., a second time that is closer to the start time of the calendar entry), in order to confirm that the route is still the best route based on current traffic conditions.

In some embodiments, the device associates (610) the determined departure time with the calendar entry (e.g., updates a record in a calendar entry data structure 302 to include an association with the determined departure time, as shown for record 312-3 of calendar entry data structure 302-1, the departure time reminder field contains a value of "5/12/14, 11:25 AM" which is a determined departure time for the calendar entry corresponding to record 312-3). In some embodiments, associating the determined departure time with the calendar entry includes (612) generating a reminder (e.g., a visual reminder, a tactile reminder (vibration), and/or an auditory reminder) and updating the calendar entry to include the generated reminder. In some embodiments, the generated reminder is distinct from a default reminder (e.g., a value in the alert field of calendar entry data structure 302-1, FIG. 3B) associated with the calendar entry.

In some embodiments, the device provides (614), on the electronic device, the generated reminder (e.g., displays a visual reminder on the touch-sensitive display such as user interface object 702 of FIG. 7B, causes the device to output a tactile reminder, and/or causes the device to produce audio output corresponding to the reminder) to the user of the determined departure time for the calendar entry. In some embodiments, providing the reminder includes, in accordance with a determination that the departure time is within a predetermined amount of time of a current time, providing the reminder (e.g., displaying the user interface object 702, FIG. 7B, on a lock screen 701). For example, the predetermined amount time is a default amount of time such as 5 minutes, 10 minutes, 15 minutes, or the like, or is a calculated amount of time based on current predictions related to changes in traffic and other factors affecting an amount of time required to reach the previously-visited address corresponding to the calendar entry (e.g., time taken to walk from an office building to a location at which the user's motor vehicle is parked). In some embodiments, the device monitors motion data (e.g., data from accelerometers 168 and/or GPS module 135) for the device and uses that motion data to determine an estimated amount of time taken by the user to reach their motor vehicle (e.g., if the device is not moving (at a first time), then moving at a pedestrian's rate of speed (at a second time), and then moving at a motor vehicle's rate of speed (at a third time), the device is able to use difference between the third time and the first time as an estimate of the amount of time taken by the user to reach their motor vehicle). In some embodiments, the device uses the estimated amount of time (or an average of numerous estimates) to determine when to provide the generated reminder to the user. In other embodiments, the device adds the estimated amount of time (or the average of many estimates) to add a buffer to the departure time and the generated reminder is then simply provided at the departure time.

As shown in FIG. 7B, the provided reminder is, in some embodiments, displayed in a user interface object 702 or, in alternative embodiments, in a user interface object 722 (as discussed below) on a lock screen 701 of the device. In some embodiments, the user interface object 702 is displayed in a central region of the lock screen 701, and includes an optional first icon 750, an optional second icon 767, and a reminder 742. In some embodiments, the first icon 750 corresponds to an icon associated with a calendar application (e.g., calendar module 148, FIG. 1A) and, in response to detecting a selection of the first icon 750, the device displays (e.g., after unlocking the device) the calendar entry within the calendar application. In some embodiments, the second icon 767 corresponds to an icon associated with a maps application (e.g., map module 154, FIG. 1A) and, in response to detecting a selection of the second icon 767, the device displays (e.g., after unlocking the device) a map interface that includes turn-by-turn directions for reaching the previously-visited address.

In some embodiments, the reminder (or alert) 742 includes a textual description that includes, for example, the departure time (e.g., 11:15 AM) and a description of the calendar entry (e.g., the title, such as "Dental Check-up"). In some embodiments, the reminder 742 allows the user to use a gesture to display affordances for performing actions associated with the reminder (e.g., start turn-by-turn directions, dismiss the reminder, snooze the reminder, and the like). As shown in FIGS. 7B-7C, in response to detecting a swipe gesture (e.g., gesture 782, FIG. 7B) over the reminder 742 that moves in a first direction (e.g., a leftward direction), the textual description for the reminder moves in the first direction, such that only a portion of the textual description is now visible of the touch screen 112, and the reminder 742 is updated (e.g., by graphics module 132) to display one or more affordances for performing actions (e.g., one or more of start directions affordance 746, snooze affordance 744, and dismiss affordance 713, FIG. 7C). In some embodiments, the one or more affordances include the snooze affordance 744 and the start directions affordance 746, while in other embodiments, the one or more affordances include the start directions affordance 746 and the dismiss affordance 713. In other embodiments, the one or more affordances include the start directions affordance 746, the snooze affordance 744, or the dismiss affordance 713.

Turning now to FIG. 7C, in some embodiments, the dismiss affordance 713, when selected, causes the device to cease displaying the reminder 742. In some embodiments, the start directions affordance 746 (also referred to herein as turn-by-turn directions affordance 746), when selected, causes the device to display a map interface (e.g., map module 154) with the previously-visited address pre-populated as the destination and turn-by-turn directions for reaching the destination already started. In some embodiments, prior to displaying the map interface, the user performs an action in order to unlock the device 100 (e.g., inputs a sequence of characters to unlock the device, provides a verbal password, provides fingerprint identification, and the like). In other embodiments, the start directions affordance 746 includes text that indicates to the user that selecting the start directions affordance 746 will cause the device to begin routing and providing the turn-by-turn directions (e.g., providing audio output corresponding to the directions) without leaving the lock screen 701.

In some embodiments, the snooze affordance 744, when selected, causes the device to cease to displaying the UI object 702 and to re-display the UI object 702 after a period of time that is selected or pre-configured by the user, or after a default time. In some embodiments, the snooze affordance 744 allows the user to select the period of time during which to snooze the reminder (e.g., snooze affordance 744 includes selectable options, such as 15 minutes, 30 minutes, 1 hour, until I'm free, and the like). For example, the user selects an option to snooze the UI object 702 for five minutes and, after five minutes, the device then re-displays the UI object 702. As another example, the user selects to snooze the UI object 702 until they are available (e.g., "Snooze until I'm Free") and, in some embodiments, the device 100 searches the calendar module 148 to identify the next open slot in the user's schedule and re-displays the UI object 702 during the identified next open slot.

In some embodiments, the user is also able to use an additional gesture (e.g., gesture 783 of FIG. 7B) to quickly access the turn-by-turn directions. In some embodiments, the additional gesture is a swipe gesture that moves in a second direction (e.g., a rightward direction), opposite to the first direction, over the reminder 742. In response to detecting the second gesture moving in the second direction, the device displays a map interface (e.g., map module 154) with the previously-visited address pre-populated as the destination and the turn-by-turn directions for reaching the destination already started. In some embodiments, prior to displaying the map interface, the user performs an action in order to unlock the device 100 (e.g., inputs a sequence of characters to unlock the device, provides a verbal password, provides fingerprint identification, and the like).

Turning back to FIG. 7B, an alternative embodiment of providing the generated reminder is illustrated with reference to user interface object 722. In some of the alternative embodiments, the provided reminder is displayed in the user interface object 722 on the lock screen 701 of the device. In some of the alternative embodiments, the user interface object 722 is displayed substantially in a central region of the lock screen 701, and includes a first icon 750(*a*), a second icon 767(*a*), a reminder 742(*a*), snooze options 744(*a*), and turn-by-turn directions affordance 746(*a*). In some of the alternative embodiments, the first icon 750(*a*) corresponds to an icon associated with a calendar application (e.g., calendar module 148, FIG. 1A) and, in response to detecting a selection of the first icon 750(*a*), the device displays (e.g., after unlocking the device) the calendar entry within the calendar application. In some of the alternative embodiments, the second icon 767(*a*) corresponds to an icon associated with a maps application (e.g., map module 154, FIG. 1A) and, in response to detecting a selection of the second icon 767(*a*), the device displays (e.g., after unlocking the device) a map interface that includes turn-by-turn directions for reaching the previously-visited address. In some embodiments, the reminder 742(*a*) includes a textual description such as "Time to Leave for your Dental Checkup!" In response to detecting a selection of the reminder 742(*a*), the device ceases to display the reminder 742(*a*) and displays (e.g., after unlocking the device) the calendar entry within the calendar application.

In some of the alternative embodiments, the snooze options 744(*a*) include one or more selectable options for ceasing to display the UI object 722 and re-displaying the UI object 722 after a period of time selected or pre-configured by the user. For example, the user selects an option to snooze the UI object 722 for two hours and, after the two hours, the device then re-displays the UI object 722. As another example, the user selects to snooze the UI object 722 until they are available (e.g., "Snooze until I'm Free") and, in some of the alternative embodiments, the device 100 searches the calendar module 148 to identify the next open slot in the user's schedule and re-displays the UI object 722 during the identified next open slot.

In some of the alternative embodiments, the turn-by-turn directions affordance 746(*a*) includes text that indicates to the user that selecting the turn-by-turn directions affordance 746(*a*) will cause the device to begin routing and providing the turn-by-turn directions (e.g., providing audio output corresponding to the directions (e.g., directions based on a selected route, as discussed above) without leaving the lock screen 701).

In some embodiments, aspects of both user interface object 702 and user interface object 722 are combined. For example, the turn-by-turn directions affordance 746 or 746(*a*) is displayed below the reminder (e.g., reminder 742 or reminder 742(*a*)) and the snooze options 744 and dismiss 713 are available through (e.g., in response to detection of) the first gesture.

In some embodiments, the device determines (616), in response to (or after) providing the reminder, whether the user has arrived at the previously-visited address (e.g., after determining that the user has stopped moving (based on data provided by, e.g., the accelerometers 168, FIG. 1A), the device compares current GPS coordinates for the device to GPS coordinates associated with the previously-visited address). In accordance with a determination that the user has arrived at the previously-visited address, the device updates location information associated with the previously-visited address. In some embodiments, updating the location information includes refining GPS coordinates associated with the previously-visited address (e.g., upon arriving at (or within a first predetermined distance of) the arrival address for the previously-visited address associated with record 412-1, if the device determines that the signal strength corresponding to the GPS 135 is greater than the signal strength when the arrival address was previously established, then the device replaces the arrival address with the current GPS coordinates of the device). In some embodiments, in accordance with a determination that the current GPS coordinates are beyond a second predetermined distance of the previously-visited address, the device adds a new record to the previously-visited address data structure 402-1 with a value for the arrival address that corresponds to the current GPS coordinates (or a physical street address that corresponds thereto). For example, the new record corresponds to a new parking location near the previously-visited address.

In some embodiments, the device requests user feedback before updating or refining the arrival address (as discussed above). In some embodiments, as shown in FIG. 7D, the device presents a user interface object to the user that allows the user to decide whether the arrival address should or should not be updated. For example, the presented user interface object is displayed within a top notification portion 710 (or, alternatively, a bottom notification portion 712), and includes an optional icon 767, a confirmation dialog 752 with selectable affordances for confirming or rejecting the updating of the arrival address, and suggested because 714 that provides the user with an indication as to why the user object is being presented. In some embodiments, an optional icon 767 corresponds to an icon associated with a maps application (e.g., map module 154, FIG. 1A) and, in response to detecting a selection of the icon 767, the device displays a map interface that includes identifiers for both the currently-stored arrival address and the potentially-updated arrival address (i.e., the current location of the device). In some embodiments, the confirmation dialog 752 includes a textual description requesting the confirmation, such as "Would you like to update the stored address for Dentist based on your current location?" In response to detecting a selection of the yes button displayed within the confirmation dialog 752, the device ceases to display the confirmation dialog 752 and updates the record associated with the previously-visited address to include an updated value for the arrival address field. In response to detecting a selection of the no button displayed within the confirmation dialog 752, the device ceases to display the confirmation dialog 752 and forgoes updating the record associated with the previously-visited address. In some embodiments, in response to detecting a selection of the suggested because affordance 714, the device displays a user interface that allows the user to configure privacy settings associated with the collection of location data and previously-visited addresses (discussed above in reference to FIGS. 4A-4B). In some embodiments, the user interface object also includes an affordance (e.g., an "x" or a "close" affordance) that allows the user to dismiss the user interface object.

In some embodiments, the device scans (618) a plurality of new calendar entries during a calendar entry creation process (e.g., calendar entry creation process illustrated in FIGS. 7E-7F). In accordance with a determination that the first identifier is included in a respective new calendar entry (e.g., field 770 includes the identifier "Dentist") of the plurality of scanned new calendar entries, the device presents the previously-visited address to the user of the device for inclusion in the respective new calendar entry (e.g., the device presents the user interface object 772 with the text "123 N. Dentist St, City, State, 12345 (tap to confirm)"). In response to detecting a selection of the user interface object 772, the device associates the new calendar entry with the previously-visited address.

It should be understood that the particular order in which the operations in FIG. 6 have been described is merely exemplary and is not intended to indicate that the described order is the only order in which the operations could be performed. One of ordinary skill in the art would recognize various ways to reorder the operations described herein.

In accordance with some embodiments, FIG. 8 shows a functional block diagram of an electronic device 800 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein. For ease of discussion, the electronic device 800 is implemented as a portable multifunction device 100 (FIG. 1A).

As shown in FIG. 8, the electronic device 800, includes a display unit 801 configured to display information (e.g., touch-sensitive display system 112 (also referred to as a touch screen, touch-sensitive display, and touch screen display), FIG. 1A), a touch-sensitive surface unit 803 (e.g., display controller 156 and touch-sensitive display system 112, FIG. 1A) configured to receive contacts, gestures, and other user inputs on the touch-sensitive display, and a processing unit 805 coupled with the display unit 801 and the touch-sensitive surface unit 803. In some embodiments, the processing unit includes an identifying unit (e.g., identifying unit 807), a retrieving unit (e.g., retrieving unit 809), a determining unit (e.g., determining unit 811), an associating unit (e.g., associating unit 813), a providing unit (e.g., providing unit 815), a selecting unit (e.g., selecting unit 817), a generating unit (e.g., generating unit 819), a receiving unit (e.g., receiving unit 821), a performing unit (e.g., performing unit 823), a scanning unit (e.g., scanning unit 825), a presenting unit (e.g., presenting unit 827), and an updating unit (e.g., updating unit 829). The processing unit is configured to: automatically, without human intervention, identify (e.g., with the identifying unit 807) a calendar entry including a first identifier, the first identifier corresponding to a geographic location that is unknown; automatically, without human intervention, retrieve (e.g., with the retrieving unit 809) a previously-visited address associated with the first identifier; automatically, without human intervention, determine (e.g., with the determining unit 811) a departure time for the calendar entry based on the previously-visited address; and automatically, without human intervention, associate (e.g., with the associating unit 813) the determined departure time with the calendar entry.

In some embodiments of the electronic device 800, the processing unit is further configured to: provide (e.g., with the providing unit 815 and (or in conjunction with) the display unit 801), on the electronic device, a reminder to the user of the determined departure time for the calendar entry. In some embodiments of the electronic device 800, the calendar entry is associated with a default reminder that is distinct from the reminder provided to the user of the determined departure time for the calendar entry. In some embodiments of the electronic device 800, providing the reminder includes, in accordance with a determination (e.g., by the determining unit 811) that the departure time is within a predetermined amount of time of a current time, providing (e.g., with the providing unit 815 and (or in conjunction with) the display unit 801) the reminder. In some embodiments of the electronic device 800, associating the determined departure time with the calendar entry includes generating (e.g., with the generating unit 819) the reminder and updating the calendar entry to include the generated reminder.

In some embodiments of the electronic device 800, determining the departure time includes: (i) determining (e.g., with the determining unit 811) a current address corresponding to the electronic device, (ii) determining (e.g., with the determining unit 811) a route from the current address to the previously-visited address, and (iii) determining (e.g., with the determining unit 811) the departure time based on an amount of time to complete the route so that the user will reach the previously-visited address within a predefined amount of time of a start time associated with the calendar entry. In some embodiments of the electronic device 800, the route is selected (e.g., with the selecting unit 817) from a plurality of available routes from the current address to the previously-visited address in accordance with routing preferences associated with the user of the electronic device.

In some embodiments of the electronic device 800, the processing unit is further configured to: before determining the departure time, receive (e.g., with the receiving unit 821) a confirmation, on the touch-sensitive display, from the user of the electronic device that the previously-visited address corresponds to the calendar entry. After receiving the confirmation, the processing unit is configured to: determine (e.g., with the determining unit 811) the departure time.

In some embodiments of the electronic device 800, retrieving the previously-visited address includes retrieving (e.g., with the retrieving unit 809) the previously-visited address from a database of previously-visited addresses associated with the user of the electronic device. In some embodiments of the electronic device 800, each previously-visited address in the database of previously-visited addresses corresponds to an address that was previously visited by the user of the electronic device. In some embodiments of the electronic device 800, retrieving the previously-visited address includes performing (e.g., with the performing unit 823) a lookup in the database of previously-visited addresses using the first identifier.

In some embodiments of the electronic device 800, the processing unit is further configured to: scan (e.g., with the scanning unit 825) a plurality of new calendar entries during a calendar entry creation process. In accordance with a determination (e.g., by the determining unit 811) that the first identifier is included in a respective new calendar entry of the plurality of scanned new calendar entries, the processing unit is configured to: present (e.g., with the presenting unit 827 and (or in conjunction with) the display unit 801) the previously-visited address to the user of the electronic device for inclusion in the respective new calendar entry.

In some embodiments of the electronic device 800, the processing unit is further configured to: in response to providing the reminder, determine (e.g., with the determining unit 811) whether the user has arrived at the previously-visited address. In accordance with a determination (e.g., by the determining unit 811) that the user has arrived at the previously-visited address, the processing unit is configured to: update (e.g., with the updating unit 829) location information associated with the previously-visited address.

The operations in the information processing methods described above are, optionally implemented by running one or more functional modules in information processing apparatus such as general purpose processors (e.g., as described above with respect to FIG. 1A) or application specific chips.

The operations described above with reference to FIG. 5 are, optionally, implemented by components depicted in FIGS. 1A-1B or FIG. 8. For example, receiving operation 606 and providing operation 614 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer-readable storage medium storing executable instructions that, when executed by an electronic device with a touch-sensitive display, cause the electronic device to:
    automatically, without human intervention:
        identify a calendar entry for a user associated with the electronic device, the calendar entry including a first identifier, and the first identifier corresponding to a geographic location that is unspecified in the calendar entry;
        retrieve, from a database of previously-visited addresses associated with the user of the electronic device, a previously-visited address associated with the first identifier, wherein each address in the database of previously-visited addresses associated with the user is recorded in accordance with a determination that the user of the electronic device has previously visited the address;
        determine a first time in the future as a departure time for the calendar entry based on the previously-visited address; and
        associate the determined departure time with the calendar entry, including updating the calendar entry to include a reminder that is configured to be presented automatically, without human intervention, to the user a predetermined amount of time prior to the determined departure time.

2. The non-transitory computer-readable storage medium of claim 1, wherein the executable instructions further cause the electronic device to: provide, on the electronic device, the reminder of the determined departure time for the calendar entry.

3. The non-transitory computer-readable storage medium of claim 2, wherein the calendar entry is associated with a default reminder that is distinct from the reminder of the determined departure time for the calendar entry.

4. The non-transitory computer-readable storage medium of claim 2, wherein providing the reminder includes, in accordance with a determination that the determined departure time is within the predetermined amount of time of a current time, providing the reminder.

5. The non-transitory computer-readable storage medium of claim 1, wherein associating the determined departure time with the calendar entry includes generating the reminder, including a visual reminder, a tactile reminder, or an audio reminder.

6. The non-transitory computer-readable storage medium of claim 1, wherein the executable instructions further cause the electronic device to:
scan a plurality of new calendar entries during a calendar entry creation process; and
in accordance with a determination that the first identifier is included in a respective new calendar entry of the plurality of scanned new calendar entries, present the previously-visited address to a user of the electronic device for inclusion in the respective new calendar entry.

7. The non-transitory computer-readable storage medium of claim 1, wherein the executable instructions further cause the electronic device to:
determine whether a user has arrived at the previously-visited address; and
in accordance with a determination that the user has arrived at the previously-visited address, update location information associated with the previously-visited address.

8. The non-transitory computer-readable storage medium of claim 1, wherein determining the departure time includes:
determining a current address corresponding to the electronic device;
determining a route from the current address to the previously-visited address; and
determining the departure time based on an amount of time to complete the route so that a user will reach the previously-visited address within a predefined amount of time of a start time associated with the calendar entry.

9. The non-transitory computer-readable storage medium of claim 8, wherein the route is selected from a plurality of available routes from the current address to the previously-visited address in accordance with routing preferences associated with the user of the electronic device.

10. The non-transitory computer-readable storage medium of claim 1, wherein the executable instructions further cause the electronic device to:
before determining the departure time, receive a confirmation, on the touch-sensitive display, from a user of the electronic device that the previously-visited address corresponds to the calendar entry; and
after receiving the confirmation, determine the departure time.

11. The non-transitory computer-readable storage medium of claim 1, wherein the executable instructions further cause the electronic device to:
detect a first upcoming event corresponding to the user of the electronic device that has a start time and an unspecified geographic location;
after identifying the first upcoming event that has a start time and an unspecified geographic location, monitor a current location of the user of the electronic device; and
in accordance with a determination that the user of the electronic device has stopped at a respective geographic location that corresponds to the first upcoming event, record the respective geographic location in the database of previously-visited addresses associated with the user of the electronic device.

12. The non-transitory computer-readable storage medium of claim 11, wherein retrieving the previously-visited address includes performing a lookup in the database of previously-visited addresses using the first identifier.

13. A method, comprising:
at an electronic device with a touch-sensitive display:
automatically, without human intervention:
identifying a calendar entry for a user associated with the electronic device, the calendar entry including a first identifier, and the first identifier corresponding to a geographic location that is unspecified in the calendar entry;
retrieving, from a database of previously-visited addresses associated with the user of the electronic device, a previously-visited address associated with the first identifier, wherein each address in the database of previously-visited addresses associated with the user is recorded in accordance with a determination that the user of the electronic device has previously visited the address;
determining a first time in the future as a departure time for the calendar entry based on the previously-visited address; and
associating the determined departure time with the calendar entry, including updating the calendar entry to include a reminder that is configured to be presented automatically, without human intervention, to the user a predetermined amount of time prior to the determined departure time.

14. The method of claim 13, further comprising, providing, on the electronic device, the reminder of the determined departure time for the calendar entry.

15. The method of claim 14, wherein the calendar entry is associated with a default reminder that is distinct from the reminder of the determined departure time for the calendar entry.

16. The method of claim 14, wherein providing the reminder includes, in accordance with a determination that the departure time is within the predetermined amount of time of a current time, providing the reminder.

17. The method of claim 13, further comprising:
scanning a plurality of new calendar entries during a calendar entry creation process; and
in accordance with a determination that the first identifier is included in a respective new calendar entry of the plurality of scanned new calendar entries, presenting the previously-visited address to a user of the electronic device for inclusion in the respective new calendar entry.

18. The method of claim 13, further comprising:
determining whether a user has arrived at the previously-visited address; and
in accordance with a determination that the user has arrived at the previously-visited address, updating location information associated with the previously-visited address.

19. An electronic device, comprising:
a touch-sensitive display;
one or more processors; and
memory storing one or more programs which, when executed by the one or more processors, cause the electronic device to:
automatically, without human intervention:
identify a calendar entry for a user associated with the electronic device, the calendar entry including a first identifier, and the first identifier corresponding to a geographic location that is unspecified in the calendar entry;
retrieve, from a database of previously-visited addresses associated with the user of the electronic device, a previously-visited address associated with the first identifier, wherein each address in the database of previously-visited addresses associated with the user is recorded in accordance with a determination that the user of the electronic device has previously visited the address;

determine a first time in the future as a departure time for the calendar entry based on the previously-visited address; and associate the determined departure time with the calendar entry, including updating the calendar entry to include a reminder that is configured to be presented automatically, without human intervention, to the user a predetermined amount of time prior to the determined departure time.

20. The electronic device of claim 19, wherein the one or more programs, when executed by the one or more processors, further cause the electronic device to: provide, on the electronic device, the reminder of the determined departure time for the calendar entry.

21. The electronic device of claim 20, wherein the calendar entry is associated with a default reminder that is distinct from the reminder of the determined departure time for the calendar entry.

22. The electronic device of claim 20, wherein providing the reminder includes, in accordance with a determination that the determined departure time is within the predetermined amount of time of a current time, providing the reminder.

23. The electronic device of claim 19, wherein associating the determined departure time with the calendar entry includes generating the reminder, including a visual reminder, a tactile reminder, or an audio reminder.

24. The electronic device of claim 19, wherein the one or more programs, when executed by the one or more processors, further cause the electronic device to:

scan a plurality of new calendar entries during a calendar entry creation process; and in accordance with a determination that the first identifier is included in a respective new calendar entry of the plurality of scanned new calendar entries, present the previously-visited address to a user of the electronic device for inclusion in the respective new calendar entry.

25. The electronic device of claim 19, wherein the one or more programs, when executed by the one or more processors, further cause the electronic device to:

determine whether a user has arrived at the previously-visited address; and in accordance with a determination that the user has arrived at the previously-visited address, update location information associated with the previously-visited address.

26. The electronic device of claim 19, wherein determining the departure time includes:

determining a current address corresponding to the electronic device;

determining a route from the current address to the previously-visited address; and determining the departure time based on an amount of time to complete the route so that a user will reach the previously-visited address within a predefined amount of time of a start time associated with the calendar entry.

27. The electronic device of claim 26, wherein the route is selected from a plurality of available routes from the current address to the previously-visited address in accordance with routing preferences associated with the user of the electronic device.

28. The electronic device of claim 19, the one or more programs, when executed by the one or more processors, further cause the electronic device to:

before determining the departure time, receive a confirmation, on the touch-sensitive display, from a user of the electronic device that the previously-visited address corresponds to the calendar entry; and after receiving the confirmation, determine the departure time.

29. The electronic device of claim 19, the one or more programs, when executed by the one or more processors, further cause the electronic device to:

detect a first upcoming event corresponding to the user of the electronic device that has a start time and an unspecified geographic location;

after identifying the first upcoming event that has a start time and an unspecified geographic location, monitor a current location of the user of the electronic device; and in accordance with a determination that the user of the electronic device has stopped at a respective geographic location that corresponds to the first upcoming event, record the respective geographic location in the database of previously-visited addresses associated with the user of the electronic device.

30. The electronic device of claim 29, wherein retrieving the previously-visited address includes performing a lookup in the database of previously-visited addresses using the first identifier.

31. The method of claim 13, wherein associating the determined departure time with the calendar entry includes generating the reminder, including a visual reminder, a tactile reminder, or an audio reminder.

32. The method of claim 13, wherein determining the departure time includes:

determining a current address corresponding to the electronic device;

determining a route from the current address to the previously-visited address; and determining the departure time based on an amount of time to complete the route so that a user will reach the previously-visited address within a predefined amount of time of a start time associated with the calendar entry.

33. The method of claim 32, wherein the route is selected from a plurality of available routes from the current address to the previously-visited address in accordance with routing preferences associated with the user of the electronic device.

34. The method of claim 13, further comprising:

before determining the departure time, receive a confirmation, on the touch-sensitive display, from a user of the electronic device that the previously-visited address corresponds to the calendar entry; and after receiving the confirmation, determine the departure time.

35. The method of claim 13, further comprising:

detecting a first upcoming event corresponding to the user of the electronic device that has a start time and an unspecified geographic location;

after identifying the first upcoming event that has a start time and an unspecified geographic location, monitoring a current location of the user of the electronic device; and in accordance with a determination that the user of the electronic device has stopped at a respective geographic location that corresponds to the first upcoming event, recording the respective geographic location in the database of previously-visited addresses associated with the user of the electronic device.

36. The method of claim 35, wherein retrieving the previously-visited address includes performing a lookup in the database of previously-visited addresses using the first identifier.

\* \* \* \* \*

UNITED STATES PATENT AND TRADEMARK OFFICE
CERTIFICATE OF CORRECTION

PATENT NO. : 10,114,544 B2
APPLICATION NO. : 14/986299
DATED : October 30, 2018
INVENTOR(S) : Gross Page 1 of 1

It is certified that error appears in the above-identified patent and that said Letters Patent is hereby corrected as shown below:

In the Claims

Claim 28, Column 48, Line 1, please delete "19, the" and insert --19, wherein the--;

Claim 29, Column 48, Line 10, please delete "19, the" and insert --19, wherein the--;

Claim 34, Column 48, Line 49, please delete "receive a" and insert --receiving a--;

Claim 34, Column 48, Line 53, please delete "determine the" and insert --determining the--.

Signed and Sealed this
First Day of January, 2019

Andrei Iancu
*Director of the United States Patent and Trademark Office*